United States Patent
Shilov et al.

(10) Patent No.: US 10,687,185 B2
(45) Date of Patent: Jun. 16, 2020

(54) V2X COMMUNICATION CONFIGURATION BASED ON GEOGRAPHICAL LOCATION

(71) Applicant: INTEL CORPORATION, Santa Clara, CA (US)

(72) Inventors: Mikhail Shilov, Nizhny Novgorod (RU); Alexey Khoryaev, Nizhny Novgorod (RU); Sergey Panteleev, Nizhny Novgorod (RU); Dmitry Belov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/067,703

(22) PCT Filed: Sep. 27, 2016

(86) PCT No.: PCT/US2016/053993
§ 371 (c)(1),
(2) Date: Jul. 2, 2018

(87) PCT Pub. No.: WO2017/171923
PCT Pub. Date: Oct. 5, 2017

(65) Prior Publication Data
US 2019/0007812 A1    Jan. 3, 2019

Related U.S. Application Data

(60) Provisional application No. 62/316,803, filed on Apr. 1, 2016.

(51) Int. Cl.
*H04W 4/50* (2018.01)
*H04W 4/40* (2018.01)
(Continued)

(52) U.S. Cl.
CPC ............. *H04W 4/40* (2018.02); *H04W 4/021* (2013.01); *H04W 4/029* (2018.02); *H04W 4/06* (2013.01); *H04W 4/46* (2018.02); *H04W 4/50* (2018.02)

(58) Field of Classification Search
CPC ....... H04W 4/50; H04W 4/021; H04W 4/029; H04W 4/046; H04W 4/06; H04W 4/40
See application file for complete search history.

(56) References Cited

U.S. PATENT DOCUMENTS

| | | | |
|---|---|---|---|
| 2011/0170495 A1* | 7/2011 | Earnshaw | H04W 72/02 370/329 |
| 2014/0092829 A1* | 4/2014 | Han | H04L 5/0035 370/329 |

(Continued)

FOREIGN PATENT DOCUMENTS

WO    2015032436 A1    3/2015

OTHER PUBLICATIONS

3GPP TR 22.885, "3rd Generation Partnership Project; Technical Specification Group Services and System Aspects; Study of LTE Support for V2X Services (Release 14)", V14.0.0, Dec. 2015, 50 pages.

(Continued)

*Primary Examiner* — Liton Miah
(74) *Attorney, Agent, or Firm* — Alliance IP, LLC

(57) ABSTRACT

The present disclosure provides for a V2X communication configuration based on geographical location. Configuring the V2X communication can include generating a partitioned cell communication area; determining a presence of a UE in a geographical location of the partitioned cell communication area, wherein the UE is associated with a vehicle; and configuring a UL communication between the UE and the V2X server based on the geographical location.

21 Claims, 13 Drawing Sheets

(51) Int. Cl.
*H04W 4/021* (2018.01)
*H04W 4/029* (2018.01)
*H04W 4/46* (2018.01)
*H04W 4/06* (2009.01)

(56) References Cited

U.S. PATENT DOCUMENTS

| | | | |
|---|---|---|---|
| 2015/0282210 A1* | 10/2015 | Li | H04W 76/14 |
| | | | 455/436 |
| 2016/0127955 A1* | 5/2016 | Damnjanovic | H04W 36/0072 |
| | | | 370/331 |
| 2016/0212596 A1* | 7/2016 | Brahmi | H04W 72/0406 |
| 2016/0295624 A1* | 10/2016 | Novlan | H04W 76/14 |
| 2018/0242115 A1* | 8/2018 | Kim | H04W 4/06 |
| 2019/0028862 A1* | 1/2019 | Futaki | G08G 1/09 |

OTHER PUBLICATIONS

Ericsson, "V2X Message Provisioning for MBMS", Tdoc R2-162821, 3GPP TSG-RAN WG2 #93-bis, Dubrovnik, Croatia, Agenda Item 8.11.2, Apr. 11-15, 2016, 9 pages.
PCT/US2016/053993, International Search Report and Written Opinion, dated Jan. 5, 2017, 15 pages.
Samsung, "Necessary enhancement for Uu based V2X", R1-160581, 3GPP TSG RAN WG1 #84, St. Julian's, Malta, Agenda Item 7.3.3.2.1, Feb. 15-19, 2016, 5 pages.
ZTE, "Some considerations on multi-cell multicast/broadcast for V2X", R2-154701, 3GPP TSG RAN WG2 #91bis, Malmo, Sweden, Agenda Item 7.11, Oct. 5-9, 2015, 5 pages.

* cited by examiner

```
1190 ─▶

┌──────────────────────────────────────────────────────────────┐
│ 1192 — Store a plurality of geographical sub-area identifiers │
│        (IDs) corresponding to a plurality of geographical     │
│        sub-areas of a partitioned cell communication area     │
└──────────────────────────────────────────────────────────────┘

┌──────────────────────────────────────────────────────────────┐
│ 1194 — Decode a configuration message from a user equipment  │
│        (UE) comprising a geographical sub-area ID             │
│        corresponding to a selection of a geographical         │
│        sub-area from the geographical sub-areas in which a    │
│        vehicle associated with the UE resides                 │
└──────────────────────────────────────────────────────────────┘

┌──────────────────────────────────────────────────────────────┐
│ 1196 — Configure at least one of a downlink (DL) communication│
│        and an uplink (UL) communication between the UE and    │
│        the eNodeB based on the selected geographical          │
│        sub-area ID                                            │
└──────────────────────────────────────────────────────────────┘
```

V2X COMMUNICATION CONFIGURATION BASED ON GEOGRAPHICAL LOCATION

RELATED APPLICATIONS

This application is a national stage filing under U.S.C. § 371 of International Patent Application No. PCT/US2016/053993, filed Sep. 27, 2016, which claims benefit of U.S. Provisional Patent Application No. 62/316,803, filed Apr. 1, 2016, each of which is hereby incorporated by reference herein in its entirety.

TECHNICAL FIELD

The present disclosure relates to vehicle-to-everything (V2X) communication configuration. In particular, the present disclosure relates to V2X communication configuration based on geographical location.

BRIEF DESCRIPTION OF THE DRAWINGS

FIG. 11 is a block diagram illustrating a method for V2X communication configuration according to one embodiment.

DETAILED DESCRIPTION OF PREFERRED EMBODIMENTS

Figure 1:
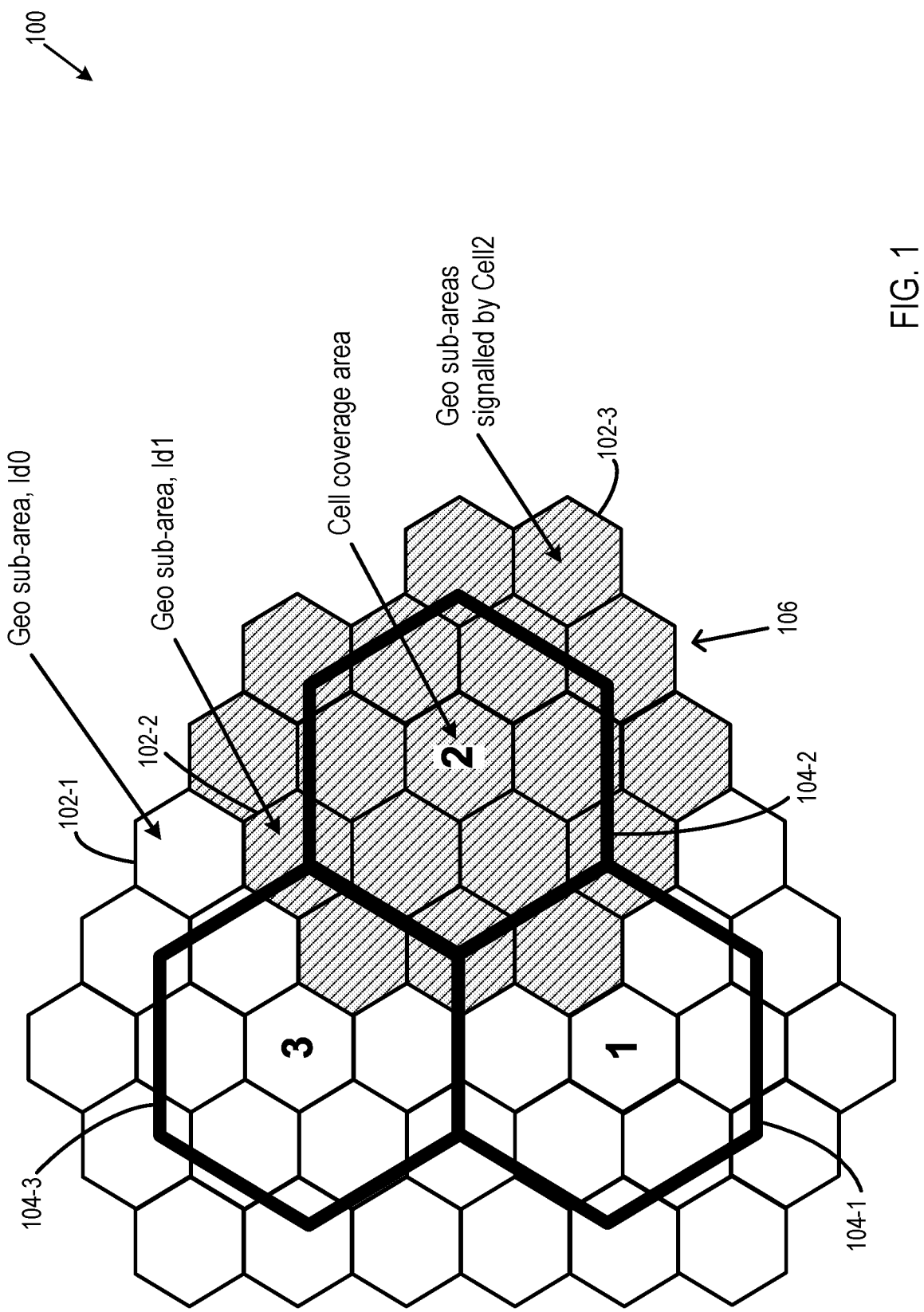
FIG. 1 is a diagram illustrating sub-areas according to one embodiment.

Wireless mobile communication technology uses various standards and protocols to generate and/or transmit data between a base station and a wireless communication device. Wireless communication system standards and protocols can include, for example, 3rd Generation Partnership Project (3GPP) long term evolution (LTE); the Institute of Electrical and Electronics Engineers (IEEE) 802.16 standard, which is commonly known to industry groups as worldwide interoperability for microwave access (Wi-MAX); and the IEEE 802.11 standard, which is commonly known to industry groups as Wireless Local Area Network (WLAN) or Wi-Fi. In 3GPP radio access networks (RANs) in LTE systems, a base station may include Evolved Universal Terrestrial Radio Access Network (E-UTRAN) Node B (also commonly denoted as evolved Node B, enhanced Node B, eNodeB, or eNB) and/or Radio Network Controllers (RNCs) in the E-UTRAN, which communicate with a wireless communication device, known as user equipment (UE). In LTE networks, the E-UTRAN may include a plurality of eNodeBs and may communicate with the plurality of UEs. LTE networks include a radio access technology (RAT) and core radio network architecture that can provide high data rate, low latency, packet optimization, and improved system capacity and coverage.

The vehicle-to-vehicle (V2V) and vehicle-to-everything (V2X) communication is an emerging field in cellular wireless communications. There is a need for V2V communication to provide various services including road safety services and/or autonomous driving service, among other type of services.

Network configuration may be considered in V2V and V2X services delivery based on the large deployment of the base stations. The broadcast nature of V2V communication can utilize broadcasting/groupcasting techniques.

Vehicle geographical information, such as geographical location, can be used at eNodeBs and/or a network to optimize groupcast transmission resource allocations, transmission schedules, and/or muted cell sets transmitting and/or muted cell sets selection.

Reference is now made to the figures, in which like reference numerals refer to like elements. For clarity, the first digit of a reference numeral indicates the figure number in which the corresponding element is first used. In the following description, numerous specific details are provided for a thorough understanding of the embodiments disclosed herein. However, those skilled in the art will recognize that the embodiments described herein can be practiced without one or more of the specific details, or with other methods, components, or materials. Further, in some cases, well-known structures, materials, or operations are not shown or described in detail in order to avoid obscuring aspects of the embodiments. Furthermore, the described features, structures, or characteristics may be combined in any suitable manner in one or more embodiments.

FIG. 1 is a diagram illustrating sub-areas according to one embodiment. FIG. 1 includes a geographical area 100 and geographical sub-areas 102-1, 102-2, and 102-3. FIG. 1 also includes intended coverage areas 104-1, 104-2, and 104-3.

Geographical location data can be utilized by UE associated with a vehicle or pedestrian to enhance V2V and V2X communication performance and network operations. The use of geographical location data can enhance services to the UE.

As used herein, a vehicle can describe any type of transportation device. A vehicle can include a car, a motorcycle, an aircraft, a watercraft, and/or a human powered vehicle. A vehicle can include an automated vehicle and/or an autonomous vehicle. For example, the vehicle can be a user controlled car or an unmanned aerial vehicle. In some examples, a vehicle can include a bicycle. As such, a V2X communication type can include a vehicle-to-pedestrian (V2P) communication type. A pedestrian can include a human and/or a bicyclist. The pedestrian can benefit from geographical information usage. As used herein, the examples described in relation to vehicles can also be applied to pedestrians including bicyclists.

A pedestrian can also describe a human with or without any mobility device. Pedestrians can include pedestrians, bicyclists, and passengers of a bus and/or train.

The UE can exist in a geographical location. The geographical location can include a physical location of the UE and/or the area surrounding the vehicle. The geographical location of a UE and the surrounding areas are referred to herein as the geographical area 100. That is, the geographical area 100 can be described in relation to the geographical location of the UE. In some examples, the geographical area 100 can also describe an area independent of a geographical location of the UE.

The geographical area data and/or geographical location data of a UE can be used to reduce geographical location signaling overhead associated with V2V communications and/or V2X communications. The geographical area 100 can be partitioned into the set of geographical sub-areas 102-1, 102-2, and 102-3, referred to herein as geographical sub-areas 102, as is shown in FIG. 1. Although FIG. 1 identifies the geographical sub-areas 102, it is to be understood that there can be more or fewer geographical sub-areas than those described in FIG. 1. For example, each of the smaller hexagons shown in FIG. 1 is a separate and distinct geographical sub-area. The geographical sub-areas 102 do not overlap. In some embodiments, the geographical sub-areas may overlap.

The geographical sub-areas 102 can be associated with logical identifiers (geo IDs) that can be unique within a geographical region. The geo IDs may be assigned by network entity or provided by an application layer of the network. The network entity can include an eNodeB, a V2X server, and/or a V2V server, among other types of network entities. A V2X server and/or a V2V server can include computing devices that facilitate the communication between vehicles and/or the communication between a vehicle and a network. As such, an eNodeB can be a V2X and/or a V2V server.

The geometrical form of the geographical sub-areas 102 is shown as hexagons. In some examples, the form of the geographical sub-areas 102 can be described by any geometrical shape that can be described by center coordinate and shape descriptor. Geometrical shapes can include polygons and ellipsoids, among other geometrical shapes.

The geographical area 100 can be geographically partitioned (geo-partitioning) into the geographical sub-areas 102.

Geo-partitioning can be used to simplify Uu V2V communication aspects. Geo-partitioning can also be used to reduce signaling overhead over a Uu link. Uu refers to the radio interface between an eNodeB and the UE associated with a vehicle and/or pedestrian. From signaling perspectives, there are two main approaches to determine a geographical sub-area that a UE associated with a vehicle and/or pedestrian belongs to.

In some examples, geographical partitioning can be established via a UE and/or an eNodeB by pre-configuring the geographical partitioning and/or via an application layer signaling, such as via non-access stratums. A UE side application layer can provide information about the geographical sub-area, such as the geo ID, based on geographical coordinates provided by location tracking application of a UE. The application layer of a UE may communicate with the V2X server or any other network entity residing in the network (or any other network entity) to receive up-to-date information on associations between geo IDs and geographical sub-areas. The direct communication between the application layer of the UE and the V2X server (e.g., eNodeB) can be transparent to an access stratum and can include periodical updates of application layer information at the eNodeB and the UE to synchronize geographical location data in the eNodeB and the UE. The geographical location data can be transparent to radio layers.

If multicast-broadcast single frequency network (MBSFN) transmissions are used, then a separate physical multicast channel (PMCH) can be allocated for geographical partitioning information delivery. If single cell point-to-multipoint (SC-PTM) transmissions are used, then a separate groupcast service with separate geographical services radio network temporary identifier (G-RNTI) for information transmission to all associated UEs can be established to transmit geographical partitioning information. Also, if SC-PTM transmission is used, then for each group of UEs, a separate G-RNTI can be allocated, and geographical partitioning information specific to each group of UEs can be transmitted with V2V data using the same group-specific G-RNTI. A G-RNTI can be selected from a subset of radio network temporary identifier s (C-RNTIs).

In some examples, geographical partitioning can be established via a radio layer signaling, such as an access stratum. The subset of geographical sub-areas 102 and corresponding geo IDs can be provided by an eNodeB radio-layer control signaling. A UE can extract geographical coordinates from an application layer and then report the geographical coordinates to an eNodeB in a predefined format. The eNodeB can respond with the geographical area data and/or data associated with a set of geographical areas surrounding the UE and/or associated logical geo IDs. However, this approach can result in significant overhead on the Uu link, given that each UE associated with a vehicle and/or pedestrian can be mobile and constantly change locations.

In some examples, descriptors of the geographical sub-areas 102 can be broadcast by an eNodeB in a predefined format describing the set of associated geographical areas (e.g., the geographical area 100). The eNodeB can also provide logical identifiers of the geographical areas and/or geographical sub-areas. Each UE can determine the set of surrounding geographical sub-areas 102 and their geo IDs in any time instance, provided that the UE has access to its own geographical coordinate. In addition, the UE may report to the eNodeB the determined geographical sub-areas 102 to which the UE belongs and/or the subset of surrounding geographical sub-areas sorted in predefined order (e.g., according to the distance to the center of the described geographical sub-areas 102).

Two examples described above differ in the entity that determines the presence of the UE in geographical sub-areas. In the example where the UE provides its coordinates to the eNodeB and the eNodeB responds, a medium access control (MAC) element and/or radio resource control (RRC) signaling can be introduced for geographical information signaling from the UE and the eNodeB sides.

In the example where the UE autonomously detects the geographical sub-areas 102, the new system information block (SIB) message can be defined and introduced to provide geo-partitioning information. In some embodiments, the geo-partitioning information can be carried within a multicast control channel (MCCH) and/or a single cell multicast control channel (SC-MCCH) defined for MBSFN and/or SC-PTM transmission options, respectively.

Geo-location specific parameters can include a geographical area ID and/or a geographical sub-area ID. A geographical area ID includes an identifier of the geographical area 100 that can include the coverage areas and/or intended coverage areas of multiple deployed cells (e.g., eNodeBs, V2X servers, V2V servers). A geographical sub-area ID includes an identifier of one of the geographical sub-areas 102, which can be a subdivision of the geographical area 100. The geographical sub-areas 102 can be smaller than the coverage area and/or the intended coverage area of a single cell. For example, any one of the geographical sub-areas 102 can be smaller than the intended coverage areas 104-1, 104-2, and 104-3, referred to generally as intended coverage areas 104. Any one of the geographical sub-areas 102 can also be smaller than a coverage area 106.

As used herein, the coverage area 106 can describe an area of coverage of a specific cell. For example, a second cell can have the coverage area 106. The coverage area 106 may or may not have a predefined shape. The intended coverage areas 104 can describe an intended area of coverage of a specific cell. As such, the intended coverage areas 104 can have a predefined shape as shown in FIG. 1. For example, the intended coverage area 104-1 can be associated with a first cell, the intended coverage area 104-2 can be associated with the second cell and the coverage area 106, and the intended coverage area 104-3 can be associated with a third cell.

In some examples, the coverage area (e.g., any one of the intended coverage areas 104) of a single cell can be divided into the multiple coverage sub-areas identified by coverage sub-area IDs. The coverage sub-area IDs can be used to optimize operation of downlink (DL) and uplink (UL) transmissions in application to Uu or PC5 V2V communication interface. In some examples, the geographical area ID and the geographical sub-area IDs can be combined in one geo-identifier that encodes both the geographical area 100 and the geographical sub-areas 102 in a considered geo-region.

Beside the logical geo-identifiers (e.g., the geographical area ID and the geographical sub-area IDs), additional descriptors can provide information about geographical area, forms, and/or shapes, so that the UE can identify the set of sub-areas it may belong to. For instance, the shapes (e.g., polygon or ellipsoid, among other shapes) can be used as a common format to provide geographical description of the geographical sub-areas 102 and sub-area center coordinates.

The geo-location information can be useful during initial cell selection procedure. As used herein, the terms "geo-location information" and "geo-location data" are used interchangeably. That is, a UE can utilize the geographical area 100, the geographical area IDs, the geographical sub-areas 102, and/or the geographical sub-area IDs, among other geo-location information, to select a cell. Using the geo-location information, UEs may prefer to associate with cells that serve the geographical sub-area in which the UE and/or the vehicle reside, provided that received signal channel quality from a given cell is greater than a predetermined threshold. The delivery of geographical services to UEs in the same geographical area 100 and/or geographical sub-area (e.g., any one of the geographical sub-areas 102) may be enhanced and the overhead related to inter-cell coordination required for delivery of V2V geo-service may be reduced by allowing a UE to select a cell that provides services to the geographical area and/or the geographical sub-area in which the UE resides.

Geo-location data may be used to determine a long-term channel quality for UEs at the same geo-location. Geo-location data can be used to optimize unicast, groupcast, and/or broadcast communications in the geographical area 100 and/or the geographical sub-areas 102. The statistical information about modulation and coding schemes (MCS) used to service the geographical area 100 and/or the geographical sub-areas 102 can be collected by an eNodeB. The eNodeB can then configure the different settings for the MCS based on the radio environment and the statistical information.

In uplink communication, geo-location information may be utilized for inter-cell resource assignment. For example, UEs that are served by different cells but belong to the same geographical sub-area from the geographical sub-areas 102 can be served on different spectrum resources in order to reduce inter-cell interference impact. The geo-information can be used to enable coordinated geographical scheduling of terminals in UL. For instance, one cell may serve nearby UEs, while the neighboring cell can serve UEs from the cell edge on the same set of resources. The described geographical scheduling behavior can be used to optimize system performance due to power-controlled transmissions towards serving cells, so that transmit (TX) power adjustment can optimize system performance.

In terms of DL communication, the geo-information can be used to determine the set of cells that can serve the particular geographical sub-areas 102. The geo-information can also be used to determine the multi-cell transmission format as well as to reduce UE receiver complexity.

To optimize the broadcast/groupcast V2V communication performance, the transmission from multiple cells can be used to reliably deliver the V2V service in the geographical area 100 and/or the geographical sub-areas 102. If a Uu V2V communication is employed, then the geographical area 100 and/or the geographical sub-areas 102 that are served by a group of eNodeBs are often determined by the geo-location of the source of V2V message transmitter. The source can include the geographical location of the UE and/or vehicle that is transmitting the V2V message. The source and the destination of a transmission can be the same geographical area 100 and/or geographical sub-area. For example, in road-safety V2V applications, the source of a V2V message can be a geographical sub-area that is also the destination of the V2V message. The transmitting vehicle geo-location information can be used to determine the geographical area 100 and/or the geographical sub-areas 102 that are served in DL. To reliably deliver a V2V message from the transmitting vehicle to the surrounding vehicles in the transmitting vehicle's target proximity range, a single-cell broadcasting and/or a multi-cell broadcasting can be considered.

Single-cell broadcasting describes the delivery of V2V messages from a single serving cell without replication of its transmission in other neighboring cells. Inter-cell interference can be a challenge in single-cell broadcasting. Therefore, coordinated cell muting can be enabled to improve radio-environment conditions. From the UE reception perspective, multiple cells can be monitored in response to a difference in serving cells. The serving cells can include source cells and transmitting cells. That is, the source cell can be different from the transmitting cell. The source cell can describe a cell that received a message, while a transmitting cell can describe a cell that delivers the message.

In some examples, broadcasting V2V messages from served/associated vehicles can reduce the system load per cell. Single-cell broadcasting with inter-cell muting can be implemented via SC-PTM and/or MBSFN.

Multi-cell broadcasting describes the delivery of V2V messages from multiple cells (e.g., a subset of deployed cells). In multi-cell broadcasting, V2V messages are shared/replicated across a subset of the multiple relevant cells. In multi-cell broadcasting, system loading may increase based on the number of cells replicating the transmission of the V2V message from non-serving cells, and thus the spectrum efficiency of this approach may be reduced. Multi-cell broadcasting can increase reliability of message delivery system frame number (SFN) transmission by multiple cells as compared to single-cell broadcasting.

Multi-cell broadcasting can be performed via an SFN transmission format and a non-SFN transmission format. For the SFN transmission format, multiple cells transmit the same data on the same set of spectrum resources serving a particular set of the geographical sub-areas 102. Non-SFN transmission format can exclude inter-cell muting. For the non-SFN transmission format, multiple cells duplicate transmission for the same information (e.g., a V2V message) but at different sets of time-frequency resources. In some examples, multi-cell SFN broadcast operation with multi-cell muting can be also considered.

The multi-cell broadcasting can be implemented with SC-PTM and/or MBSFN as described below. Geo-location information can be utilized to reduce the UE receiver complexity. The UE receiver complexity reduction can be achieved through reduction in the quantity of cells that are monitored by the UE and/or in the quantity of spectrum resources that are utilized by the UE by implementing multi-cell broadcasting instead of single-cell broadcasting.

A number of reduction techniques can be implemented in conjunction with multi-cell broadcasting. In some examples, the UE can monitor cells that are service specific geographical sub-areas 102 of interest. The UE can monitor G-RNTIs that are associated with the specific geographical sub-areas 102 of interest. The UE can process subsets of spectrum resources (e.g., subframe sets/transmission schedules) that are associated with the specific geographical sub-areas 102 of interest (e.g., set of subframes). The UE may also be configured to monitor search spaces that are associated with the specific geographical sub-areas 102 of interest. As used herein, a search space refers to the set of resources allocated for transmission of control information from an eNodeB to a UE.

Figure 2:
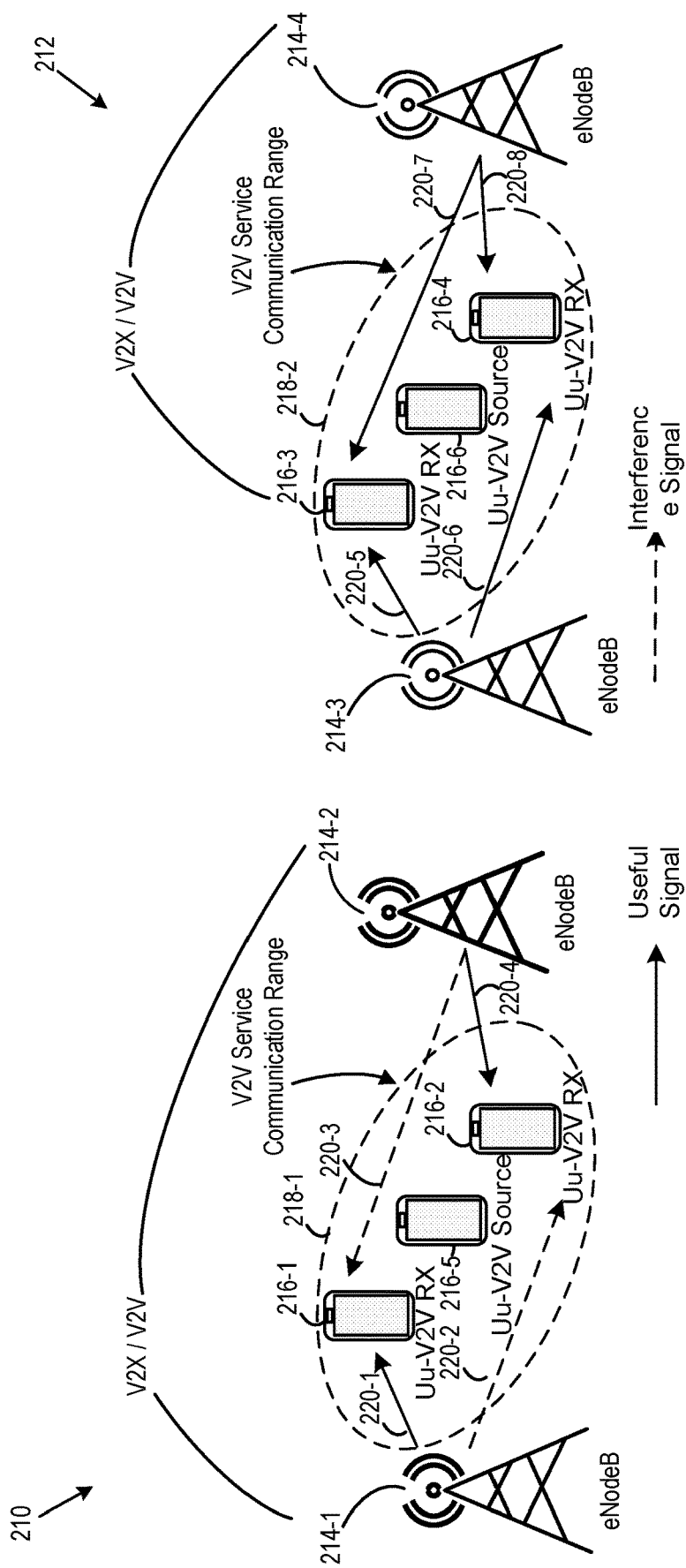
FIG. 2 is a system diagram illustrating V2X communications according to one embodiment.

FIG. 2 is a system diagram illustrating V2X communications according to one embodiment. FIG. 2 includes an SC-PTM signal reception 210 and an MBSFN signal reception 212. FIG. 2 also shows eNodeBs 214-1, 214-2, 214-3, and 214-4, referred to generally as eNodeBs 214, and UEs 216-1, 216-2, 216-3, and 216-4, referred to generally as UEs 216. FIG. 2 further shows transmissions 220-1, 220-2, 220-3, 220-4, 220-5, 220-6, 220-7, and 220-8. FIG. 2 also shows V2V service communication ranges 218-1 and 218-2.

The UEs 216 represent UEs that are associated with vehicles. For example, the UE 216-1 is associated with a first vehicle, the UE 216-2 is associated with a second vehicle, the UE 216-3 is associated with a third vehicle, and the UE 216-4 is associated with a fourth vehicle. The embodiments described herein can be used to assist the communication between vehicles. For example, the SC-PTM signal reception 210 and/or the MBSFN signal reception 212 can be used to enable communications between a first vehicle (e.g., the UE 216-1) and a second vehicle (e.g., the UE 216-2) and communications between a third vehicle (e.g., the UE 216-3) and a fourth vehicle (e.g., the UE 216-4), respectively.

The Uu-based V2V service provided by the eNodeBs 214-1 and 214-2 includes DL broadcasting of the data originated from Uu-V2V transmitter UEs 216-5 and 216-6 (e.g., source) to the UEs 216-1 and 216-2 (e.g., destination) located in the V2V service communication range 218-1. For example, the UE 216-5 can transmit data to the eNodeB 214-1 and/or the eNodeB 214-2, and the eNodeB 214-1 or 214-2 can deliver the data to the UE 216-2, both the UE 216-5 and the UE 216-2 being in the same communication range 218-1. As used herein, the communication range 218-1 can include a geographical area, a geographical sub-area, a coverage area (e.g., a coverage area of an eNodeB), and/or an intended coverage area (e.g., an intended coverage area of an eNodeB).

In previous approaches, an SC-PTM transmission includes groupcast data transmissions from a single cell (e.g., the eNodeBs 214-1 and 214-2) to the associated UEs 216-1 and 216-2. The eNodeBs 214-1 and 214-2 may transmit without coordinating with each other. The uncoordinated transmission may lead to strong inter-cell co-channel interference. For example, the transmissions 220-1 and 220-3 are uncoordinated and as such can lead to strong inter-cell co-channel interference such that the transmission 220-1 may result in useful transmission and the transmission 220-3 may result in an un-useful transmission due to the interference to the transmission 220-1. Similarly, the transmission 220-2 may interfere with the transmission 220-4.

In MBSFN, data transmissions can be based on a same signal transmission from the set of multiple cells that belong to a particular MBSFN area (e.g., the communication range 218-2). The UEs 216-3 and 216-4 may receive data broadcasted from multiple cells. For example, each of the UEs 216-3 and 216-4 can receive data broadcasted from the eNodeBs 214-3 and 214-4.

In the previous approaches including the MBSFN and/or SC-PTM operation modes, the control information and data are delivered from the same set of sources (e.g., the eNodeBs 214-1, 214-2, 214-3, and 214-4). In some embodiments, the control information and the data can be delivered from different eNodeBs to accommodate reception by UEs which are not assigned to source eNodeBs but are located within the target communication range from the V2V transmitter (e.g., source UE).

Figure 3:
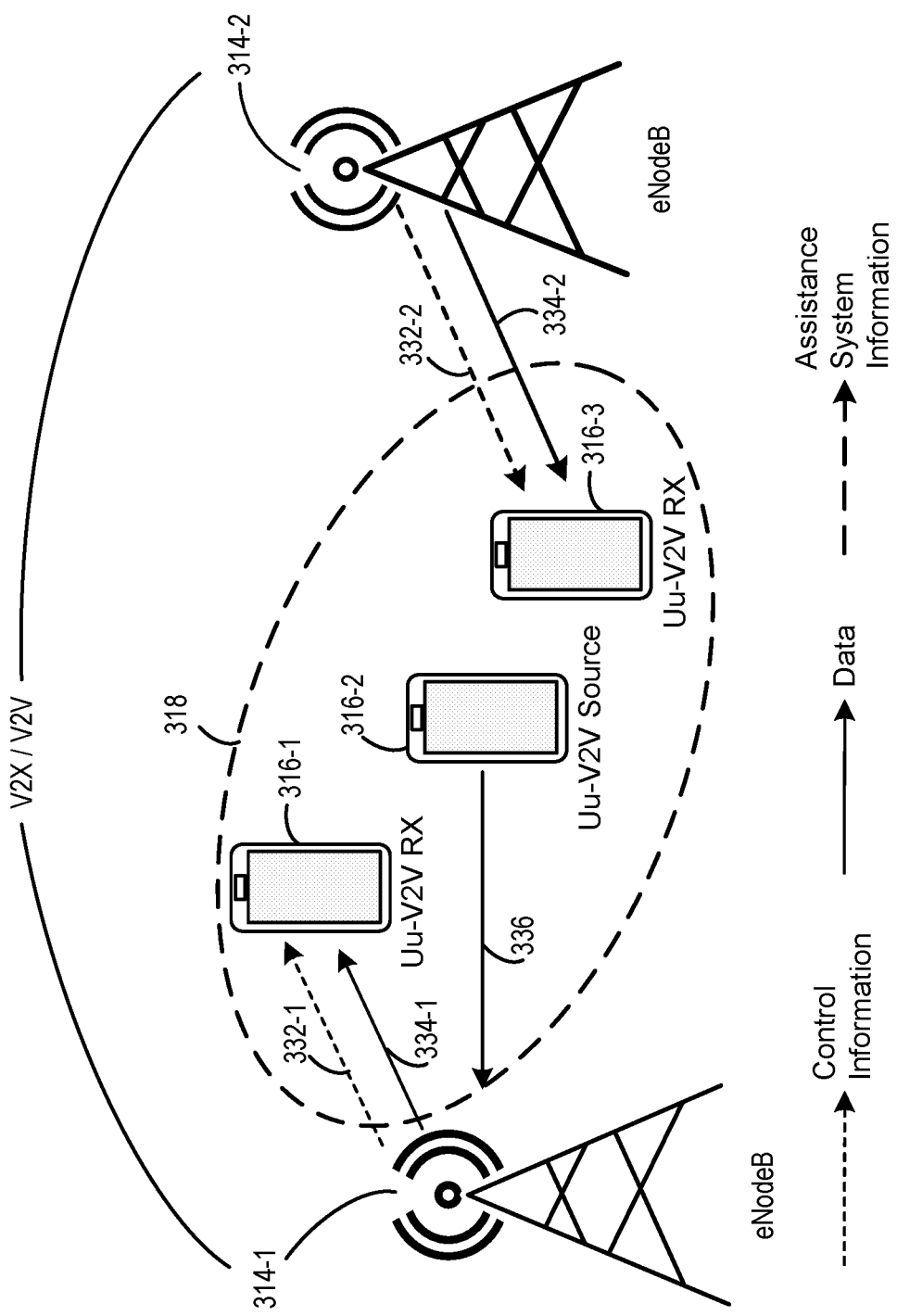
FIG. 3 is a system diagram illustrating V2X communication configuration according to one embodiment.

FIG. 3 is a system diagram illustrating V2X communication configuration according to one embodiment. FIG. 3 includes eNodeBs 314-1 and 314-2, UEs 316-1, 316-2, and 316-3, a communication range 318, control information 332-1 and 332-2, and data 334-1 and 334-2.

In FIG. 3, the UE 316-2 can be a source of data 336. The UE 316-2 can generate and provide the data 336 to the eNodeB 314-1. The eNodeB 314-1 can deliver the data 334-1 and the control information 332-1 to the UE 316-1. The eNodeB 314-1 can also forward the data to the eNodeB 314-2. The eNodeB 314-2 can deliver the data 334-2 and the control information 332-2 to the UE 316-3. That is, the control information 332-1 and 332-2 and the data 334-1 and 334-2 are provided by the eNodeBs 314-1 and 314-2 of the receiving UEs 316-1 and 316-3. That is, the control information 332-1 and 332-2 and the data 334-1 and 334-2 are provided by serving cells of the V2V receivers. In FIG. 3 the serving cell of the UE 316-1 is the eNodeB 314-1 and the serving cell of the UE 316-3 is the eNodeB 314-2. As such, the UE 316-1 can receive the data 334-1 and the control information 332-1 from the eNodeB 314-1, and the UE 316-3 can receive the data 334-2 and the control information 332-2 from the eNodeB 314-2.

Figure 4:
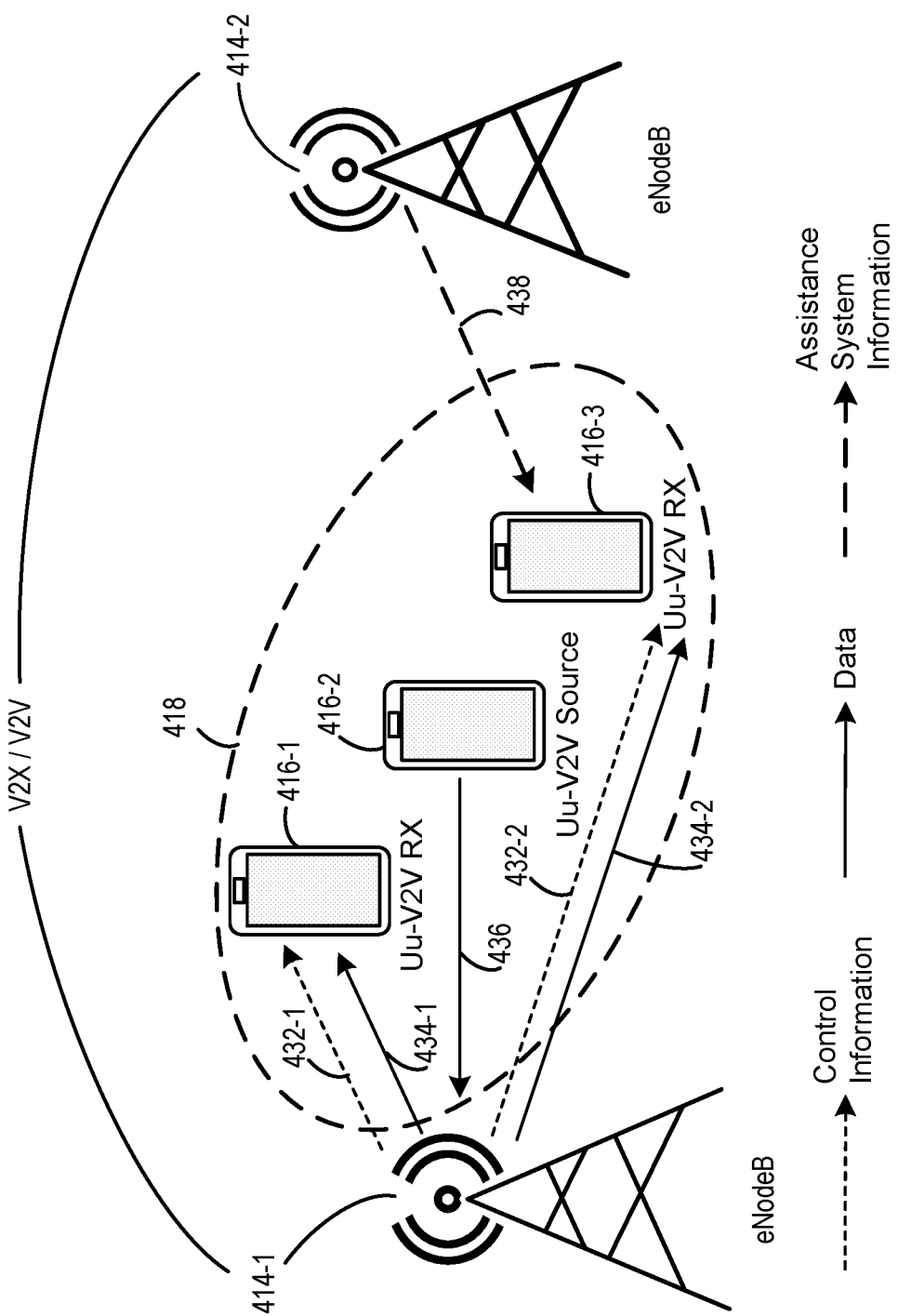
FIG. 4 is a system diagram illustrating V2X communication configuration according to one embodiment.

FIG. 4 is a system diagram illustrating V2X communication configuration according to one embodiment. FIG. 4 includes eNodeBs 414-1 and 414-2, UEs 416-1, 416-2, and 416-3, a communication range 418, control information 432-1 and 432-2, data 434-1 and 434-2, data 436, and assistance system information 438.

In FIG. 4, the UE 416-2 can be a source of the data 436. The UE 416-2 can generate and provide the data 436 to the eNodeB 414-1. The eNodeB 414-1 can deliver the data 434-1 and the control information 432-1 to the UE 416-1 and the UE 416-3. The eNodeB 414-2 can deliver the assistance system information 438 to the UE 416-3. That is, the control information 432-1 and 432-2 and the data 434-1 and 434-2 are provided by the serving cell of the V2V transmitter and not the serving cell of the V2V receiver. In FIG. 4 the serving cell of the UE 416-2 that transmits the data 436 is the eNodeB 414-1. As such, the eNodeB 414-1 also delivers the data 434-1 and 434-2 and the control information 432-1 and 432-2 to the UEs 416-1 and 416-3, respectively.

Figure 5:
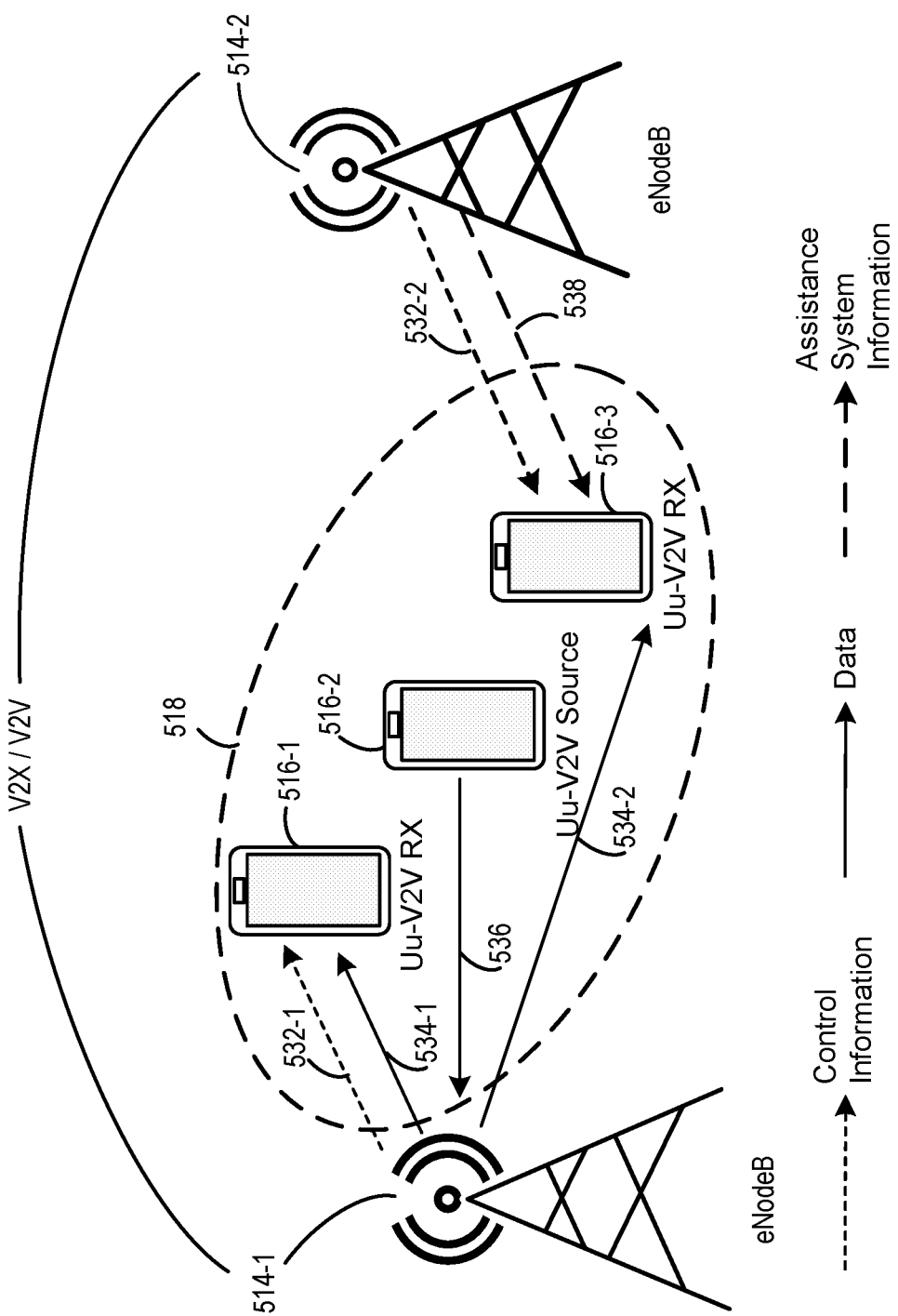
FIG. 5 is a system diagram illustrating V2X communication configuration according to one embodiment.

FIG. 5 is a system diagram illustrating V2X communication configuration according to one embodiment. FIG. 5 includes eNodeBs 514-1 and 514-2, UEs 516-1, 516-2, and 516-3, a communication range 518, control information 532-1 and 532-2, data 534-1 and 534-2, upload data 536, and assistance system information 538.

In FIG. 5, the UE 516-2 can be a source of the data 536. The UE 516-2 can generate and provide the data 536 to the eNodeB 514-1. The eNodeB 514-1 can deliver the data 534-1 and the control information 532-1 to the UE 516-1 and the data 534-2 to the UE 516-3. The eNodeB 514-2 can deliver the assistance system information 538 and the control information 532-2 to the UE 516-3. That is, the control information can be provided by the serving cell of the V2V receiver. As such, the control information 532-1 can be provided by the eNodeB 514-1 to the UE 516-1. The control information 532-2 can be provided by the eNodeB 514-2 to the UE 516-3. The data can be provided by the serving cell of the V2V transmitter. The serving cell of the V2V transmitter UE 516-2 is the eNodeB 514-1. As such, the data 534-1 and 534-2 can be provided by the eNodeB 514-1 to the UEs 516-1 and 516-3.

In some examples, control information is provided by the serving cell of the V2V transmitter and data is provided by the serving cell of the V2V receiver.

Figure 6:
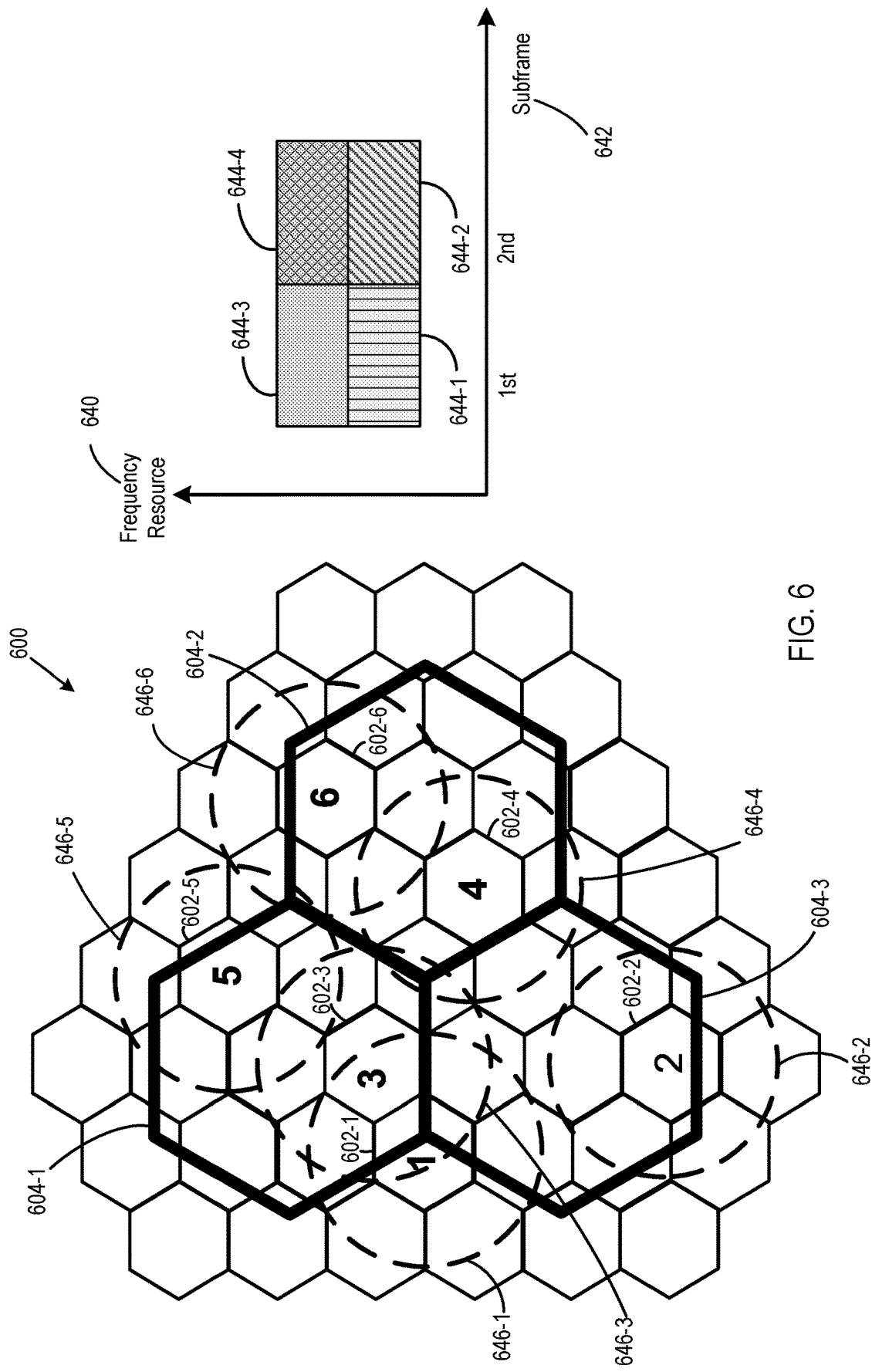
FIG. 6 is a diagram illustrating frequency and subframe resources according to one embodiment.

FIG. 6 is a diagram illustrating frequency and subframe resources according to one embodiment. FIG. 6 includes a frequency resource 640 (e.g., referred to generally as frequencies 640) and subframes 642. FIG. 6 also includes a geographical area 600 and geographical sub-areas 602-1, 602-2, 602-3, 602-4, 602-5, and 602-6, referred to generally as geographical sub-areas 602. FIG. 6 also includes the intended coverage areas 604-1, 604-2, and 604-3, referred to generally as intended coverage areas 604, and UE communication areas 646-1, 646-2, 646-3, 646-4, 646-5, and 646-6.

FIG. 6 shows an example of a transmission schedule. A transmission schedule is an SC-PTM enhancement for single-cell broadcasting with inter-cell muting. SC-PTM enhancements can support transmission in DL. SC-PTM enhancements for transmission in DL can include geographical radio network temporary identifier (RNTI) allocation, determination of a geographical sub-area ID of a transmitting vehicle, and inter-cell coordination of an SC-PTM transmission schedule.

RNTI can be associated with transmissions (e.g., services) targeted to a geographical sub-area. Geographical RNTI allocation from a pool of RNTI values can include a single geographical RNTI definition and a multiple geographical RNTI definition. The single geographical RNTI definition can include no geographical sub-area to RNTI mapping information. Each UE, associated with a cell and interested in a geographical service, can monitor downlink control information (DCI) scrambled with a predefined geographical RNTI. As a further enhancement, the geographical location information (e.g., geographical area ID and/or geographical sub-area ID) can be incorporated into control information to allow UEs to limit the monitoring of transmissions to transmissions that the UEs are interested in.

For a multiple geographical RNTI definition, the subset of the geographical RNTI values are allocated and/or assigned to geographical services. Each of the allocated geographical RNTIs may be associated with a geographical service or a plurality of geographical services. A plurality of geographical services associated with a same geographical RNTI can be provided to a geographical area and/or a geographical sub-area. That is, a geographical RNTI can be assigned and/or generated for each geographical area and/or geographical sub-area.

In some examples, the determination of a geographical sub-area ID of a transmitting vehicle can be based on the geographical coordinates of a UE and/or associated vehicle. The transmitting UE associated with a vehicle or pedestrian can report to the serving cell in UL at least a geographical coordinate (e.g., relative geographical coordinate or absolute geographical coordinate). The serving cell (e.g., eNodeB) can determine the geographical sub-area ID of the UE associated with a vehicle or pedestrian based at least on the geographical coordinate. In some embodiments, a UE can identify a geographical sub-area ID and/or a geographical area ID and V2V message to be delivered in DL. The geographical area ID and/or the geographical sub-area ID can be provided implicitly or explicitly. A Layer-1 and/or Layer-2 reporting mechanism can be used to report the geographical area ID and/or the geographical sub-area ID (e.g., geographical location data). In some examples, the report of the geographical area ID and/or the geographical sub-area ID can be provided to an eNodeB via a MAC, RRC signal, and/or implicit signaling by utilizing scrambling using the geographical area and/or geographical sub-area ID. The report of the geographical area ID and/or the geographical sub-area ID can also be provided to an eNodeB via a physical uplink control channel (PUCCH), a channel quality indicator (CQI) of the PUCCH, and/or a precoding multicast indicator (PMI) reporting mechanism.

The inter-cell coordination of an SC-PTM transmission schedule is described in FIG. 6. As used herein, inter-cell can refer to the schedule of SC-PTM transmissions in the intended coverage areas 604 of a cell (e.g., eNodeB). As such, the inter-cell coordination of an SC-PTM transmission schedule describes the scheduling of the transmissions to UEs within an intended coverage area from the intended coverage areas 604.

To receive, at the UEs, transmissions from the neighboring cells, coordinated inter-cell muting can be applied to improve the reliability of signal reception in the geographical sub-areas 602. The inter-cell muting may be applied across different sets of subframes or subsets of frequency resources. In order to enable muting in a distributed network, the X2 application protocol (X2AP) signal exchange (e.g., LOAD_INFORMATION IE signal) can be used to indicate an association (e.g., link) between the G-RNTIs, the geographical sub-area IDs, and/or a set of subframes and/or physical resource blocks (e.g., transmission schedule) used to deliver geographical sub-area specific transmissions. The eNodeBs can perform SC-PTM transmissions to specific geographical sub-areas 602 and/or the geographical area 600 based on the association between G-RNTIs, the geographical sub-area IDs, and/or the set of subframes and/or physical resource blocks.

A centralized network entity can provide the transmission schedule associated with cell IDs, geographical sub-area IDs, and/or G-RNTIs in order to improve reception from the neighboring cells. The centralized network entity can include a broadcast multicast service center (BM-SC), a multi-cell coordination entity (MCE), a V2X server, and/or a V2X control function.

The transmission schedule is described in terms of the frequencies 640 and the subframes 642. FIG. 6 shows two frequencies 640 and two subframes 642, but more or fewer frequencies and subframes can be used. A transmission schedule 644-1 can be scheduled to occur at a first frequency from the frequencies 640 and at a first subframe from the subframes 642. A transmission schedule 644-2 can be scheduled to occur at the first frequency from the frequencies 640 and at a second subframe from the subframes 642. A transmission schedule 644-3 can be scheduled to occur at a second frequency from the frequencies 640 and at a first subframe from the subframes 642. A transmission schedule 644-4 can be scheduled to occur at a second frequency from the frequencies 640 and at a second subframe from the subframes 642.

Each of the UEs located within a particular geographical sub-area from the geographical sub-areas 602 can be scheduled similarly. For examples, the UEs in the geographical sub-area 602-1 are scheduled at the transmission schedule 644-1, the UEs in the geographical sub-area 602-2 are scheduled at the transmission schedule 644-1, the UEs in the geographical sub-area 602-3 are scheduled at the transmission schedule 644-2, the UEs in the geographical sub-area 602-4 are scheduled at the transmission schedule 644-3, the UEs in the geographical sub-area 602-5 are scheduled at the transmission schedule 644-3, and/or the UEs in the geographical sub-area 602-6 are scheduled at the transmission schedule 644-2.

An eNodeB with the intended coverage area 604-1 can schedule UEs in the geographical sub-areas 602-1 and 602-5 in different frequency resources in the same subframe to minimize co-channel interference. In the intended coverage area 604-3, the associated eNodeB can communicate with UEs in the geographical sub-area 602-2 at a same subframe and frequency resource (e.g., the transmission schedule 644-1) as used by an eNodeB with the intended coverage area 604-1 to communicate with UEs in the geographical sub-area 602-1 due to a large spatial separation between the UE communication areas 646-1 and 646-2. Similarly, the UEs in the geographical sub-areas 602-4 and 602-5 can be served in a same time-frequency resource (the transmission schedule 644-3) by eNodeBs associated with the intended coverage areas 604-1 and 604-2, respectively. A transmission time division can be applied to the scheduling of UEs in the geographical sub-area 602-3 and the geographical sub-area 602-4 due to the overlap of the UE coverage areas 646-3 and 646-4. The transmission time division can include a difference in the subframes 642. For examples, UEs in the geographical sub-area 602-3 are scheduled at the transmission schedule 644-2, which is in a second subframe, while the UEs in the geographical sub-area 602-4 are scheduled at the transmission schedule 644-3, which is in a first subframe.

SC-PTM enhancements can support reception in DL. Enhancements to reception in DL can include a DL transmission schedule and association of geographical sub-area IDs, cell IDs, and/or SC-PTM G-RNTIs.

The DL transmission schedule represents the set of subframes, occurring in time, that a UE monitors in order to receive information from neighboring cells. The serving eNodeB can provide information about the DL transmission schedule in the neighboring cell. The DL transmission schedule can be associated with specific G-RNTIs or eNodeB IDs.

A UE may not monitor (e.g., disregard) both a serving cell and neighboring cells in a same subframe. As such, a DL transmission schedule can be configured such that all cells are coordinated or a serving cell can independently be configured in a set of subframes that the UE does not monitor. A DL transmission schedule can be configured similarly to the measurement GAP mechanism used for neighboring cells inter-frequency measurements. A UE can be configured to monitor a first number of subframes for reception from a serving cell, while a second number of subframes are monitored for reception from neighboring cells. The subframes included in the first number of subframes and the second number of subframes can be configured based on the geographical sub-area, the geographical area, the geographical sub-area ID, the geographical area ID, and/or the G-RNTI. The subframes included in the first number of subframes and the second number of subframes can be UE specific and/or cell specific.

The DL transmission schedule can be provided to a UE by a serving eNodeB. The DL transmission schedule can include a transmission schedule bitmap parameter and/or a bitmap repetition period, among other parameters. The transmissions schedule bitmap can define subframe sets which the UE monitors. The bitmap repetition period which could be measured in subframes, frames or other time instances defines the period of the bitmap transmission schedule repetition.

Figure 7:
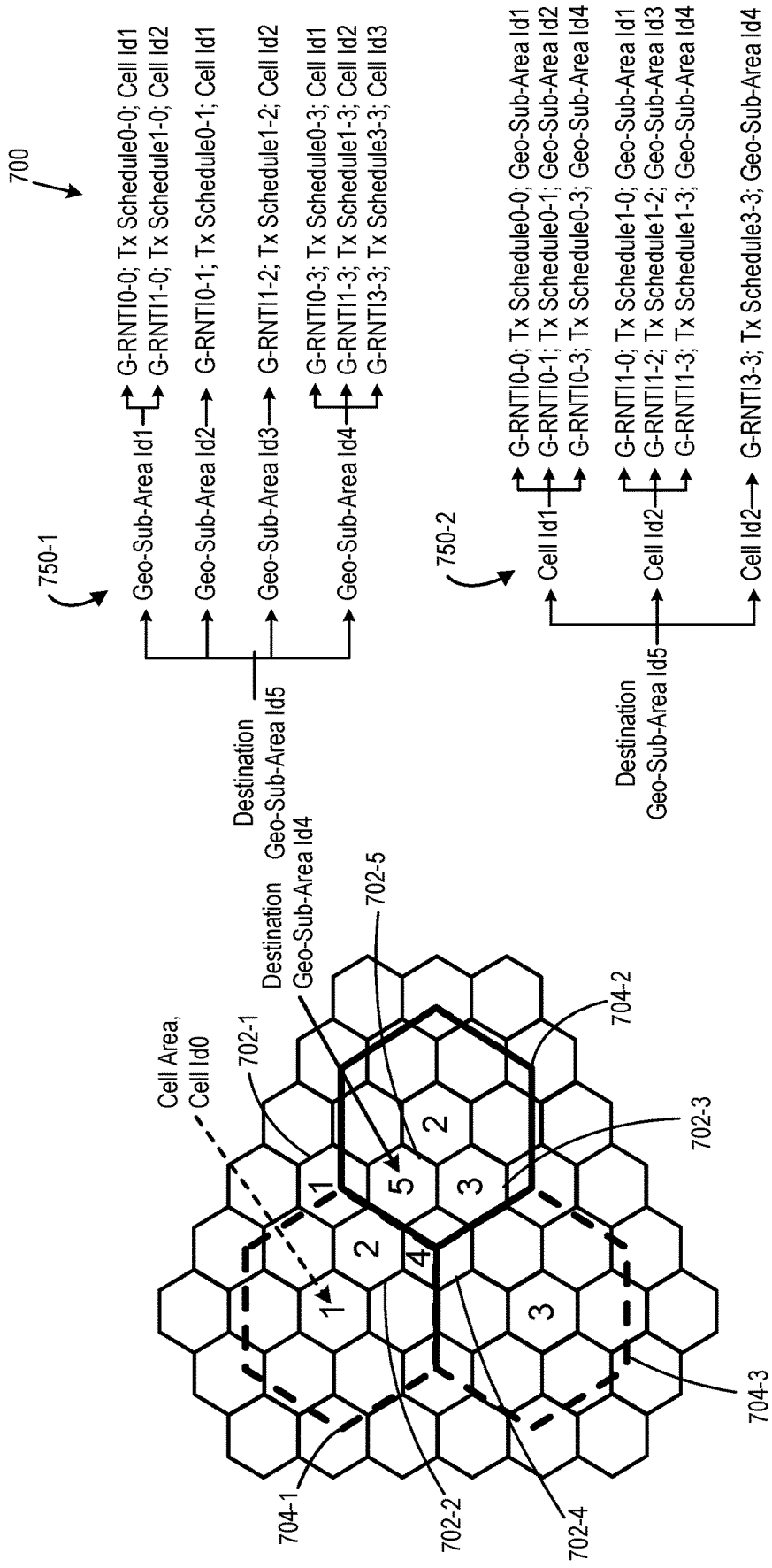
FIG. 7 is a diagram illustrating associations of destination sub-areas and geographical services radio network temporary identifiers (G-RNTIs) according to one embodiment.

FIG. 7 is a diagram illustrating associations of destination sub-areas and G-RNTIs according to one embodiment. FIG. 7 includes a geographical area 700 and intended coverage areas 704-1, 704-2, and 704-3, referred to generally as intended coverage areas 704. FIG. 7 also includes geographical sub-areas 702-1, 702-2, 702-3, 702-4, and 702-5, referred to generally as geographical sub-areas 702. FIG. 7 further includes associations 750-1 and 750-2, referred to generally as associations 750.

Enhancements to support reception in DL can include the association of geographical sub-area IDs with cell IDs, SC-PTM transmission schedule, and/or G-RNTIs. A serving eNodeB can provide assistance information including a list of geographical sub-area IDs to a UE. Each geographical sub-area ID can be associated with a number of neighboring cells and/or a list of monitored cell IDs that a UE monitors. For each neighboring cell and/or cell ID that is monitored by a UE, the serving eNodeB can provide a plurality of G-RNTIs that the UE monitors for reception of SC-PTM transmissions from neighboring cells.

As used herein, a neighboring cell can include cells that are adjacent to a serving cell of a UE. In some examples, neighboring cells can be defined based on distance to a serving cell. For example, neighboring cells include cells that are within a predetermined threshold distance of a service cell. Neighboring cells can also be defined based on distance to a UE. For example, neighboring cells, excluding the serving cell, include cells that are within a predetermined threshold distance of a UE.

FIG. 7 shows two types of associations 750. In the association 750-1, the existing SC-PTM configuration messages are updated with new optional fields. An SC-PTM configuration message can be extended with new optional fields to support potential service associations with specific geographical sub-areas 702. The new optional fields can include a geographical sub-area ID field, a geographical neighboring cell list, G-RNTIs, and/or transmission schedules.

For example, the association 750-1 can include an association of a geographical sub-area ID to a geographical neighboring sub-area ID. The association 750-1 can also include an association of the geographical neighboring sub-area ID to G-RNTI, Tx schedule, and cell ID.

For example, the association 750-1 associates the geographical sub-area 702-5 with the neighboring geographical sub-areas 702-1, 702-2, 702-3, and 702-4. The association 750-1 also associates the geographical sub-area 702-1 to the $G$-$RNTI_{0-0}$, the Tx $schedule_{0-0}$, and cell $ID_1$ with the intended coverage area 704-1 and to the $G$-$RNTI_{1-0}$, the Tx $schedule_{1-0}$, and cell $ID_2$ with the intended coverage area 704-2. The $G$-$RNTI_{0-0}$ corresponds to radio network temporary identifier assigned to the service data originated in geographical sub-area 702-1 and broadcasted by cell with cell $ID_1$. The association 750-1 also associates the geographical sub-area 702-2 to the $G$-$RNTI_{0-1}$, the Tx $schedule_{0-1}$, and cell $ID_1$ with the intended coverage area 704-1. The association 750-1 also associates the geographical sub-area 702-3 to the $G$-$RNTI_{1-2}$, the Tx $schedule_{1-2}$, and cell $ID_2$ with the intended coverage area 704-2. The association 750-1 also associates the geographical sub-area 702-4 to the $G$-$RNTI_{0-3}$, the Tx $schedule_{0-3}$, and cell $ID_1$ with the intended coverage area 704-1, to the $G$-$RNTI_{1-3}$, the Tx $schedule_{1-3}$, and cell $ID_2$ with the intended coverage area 704-2, and to the $G$-$RNTI_{3-3}$, the Tx $schedule_{3-3}$, and cell $ID_3$ with the intended coverage area 704-3.

The geographical sub-area ID field can be added into the single cell multicast traffic channel (SC-MTCH) information to identify the geographical sub-area covered by a particular groupcast service. In the SC-MTCH information, the SC-MTCH neighboring cell bitmap can be replaced with geographical neighboring cell list, or a new geographical neighboring cell list can be added to indicate the list of neighboring cells with the set of monitored neighbor geographical sub-area IDs, G-RNTIs, and transmission schedules.

In the association 750-2, a signaling similar to the SC-PTM control channel signal can be used. The signaling similar to existing SC-PTM control channel signaling can be used to provide the geographical sub-areas 702 to neighboring cells with geographical cell IDs and G-RNTIs. The signal similar to the SC-PTM control channel signal can include defining a new geographical sub-area association message, defining a new logical control channel (SC-GEOCCH), defining a new SC-GEO-RNTI with predefined values, and introducing a new system information block type.

The new geographical sub-area association message can include a destination geographical sub-area ID field, a geographical sub-area G-RNTI field, and a neighboring geographical cell list field. The neighboring geographical cell list can be associated with a cell ID, a list of G-RNTIs, and a transmission schedule.

The new SC-GEOCCH can be defined to provide the list of geographical sub-area association messages to UEs. The new SC-GEO-RNTI can be defined with predefined values to provide the scheduling of the SC-GEOCCH. The new system information block type can be provided to configure the SC-GEOCCH transmission parameters. The SC-GEOCCH transmission parameters can include a repetition period, a subframe offset, and/or a modification period, among other possible SC-GEOCCH transmission parameters.

As such, the association 750-2 can associate the geographical sub-area 702-5 with a cell $ID_1$ having the intended coverage area 704-1, a cell $ID_2$ having the intended coverage area 704-2, and a cell $ID_3$ having the intended coverage area 704-3.

The cell $ID_1$ can be associated with a $G$-$RNTI_{0-0}$, a Tx $schedule_{0-0}$, and a geographical sub-area $ID_1$. The cell $ID_1$ can also be associated with a $G$-$RNTI_{0-1}$, a Tx $schedule_{0-1}$, and a geographical sub-area $ID_2$. The cell $ID_1$ can further be associated with a $G$-$RNTI_{0-3}$, a Tx $schedule_{0-3}$, and a geographical sub-area $ID_4$.

The cell $ID_2$ can be associated with a $G$-$RNTI_{1-0}$, a Tx $schedule_{1-0}$, and a geographical sub-area $ID_1$. The cell $ID_2$ can also be associated with a $G$-$RNTI_{1-2}$, a Tx $schedule_{1-2}$, and a geographical sub-area $ID_3$. The cell $ID_3$ can further be associated with a $G$-$RNTI_{1-3}$, a Tx $schedule_{1-3}$, and a geographical sub-area $ID_4$. The cell $ID_3$ can be associated with a $G$-$RNTI_{3-3}$, a Tx $schedule_{3-3}$, and a geographical sub-area $ID_4$.

In some examples, an association (not shown) can use transparent SC-PTM operations where an association table is transmitted with G-RNTI information. The association table (e.g., associations between geographical sub-area IDs and neighboring geographical sub-areas, G-RNTIs, Tx schedules, and cell IDs) can be provided transparently to the radio access technology (RAT) using the already established groupcast transmission with already assigned G-RNTI.

In some examples, a number of MBSFN enhancements can also be implemented. MBSFN may also be used to organize broadcastings of the V2V services. In a first MBSFN enhancement, an MBSFN area can be configured at each cell. The first MBSFN enhancement can include determining a geographical sub-area ID of a UE associated with a vehicle or pedestrian, inter-cell coordination of MBSFN transmissions, and a DL transmission schedule.

Determining a geographical sub-area ID of a UE associated with a vehicle or pedestrian can include a UE verifying its presence in a geographical sub-area using a UL transmission as described in the SC-PTM enhancements. Inter-cell coordination of MBSFN transmissions can be based on time domain multiplexing of MBSFN areas belonging to neighboring cells.

Time multiplexing of the different MBSFN areas, which belong to the same cell, is assumed in MBSFN. To improve reliability of the transmissions in a single cell transmission scenario, the time domain multiplexing of MBSFN areas of neighboring cells can be used. Such coordination may be performed in a centralized manner if a single MCE is configured in the network. In an alternative distributed MCE network configuration, the signaling among MCE entities can be used to elaborate on common MBSFN area subframe transmission patterns.

The separate PMCH inside each MBSFN area may be associated with certain geographical sub-areas 702. The different MCS and the number of subframes may be assigned to each PMCH in order to balance spectral efficiency and adapt to the traffic load in each geographical sub-area. The enhanced inter-cell coordination may be used for coordination of each PMCH transmission associated with a geographical sub-area.

To associate a PMCH with a specific geographical sub-area, the geographical sub-area ID can be provided. For example, the PMCH information can be updated with the new geographical sub-area ID field. Once a UE detects the MCCH, the UE may down-select the subframes with PMCHs that may carry information to a receiving UE.

The DL transmission schedule can be similar to the SC-PTM transmission schedule. The DL transmission schedule for MBSFN can be provided by the serving cell to the UEs. In some examples, the transmission scheduler can provide the MBSFN subframes to the UE, which the UE can use to monitor eNodeBs and/or G-RNTIs and receive data from neighboring geographical sub-areas and receive PMCH transmission parameters. The transmission schedule for each neighboring cell can be provided in SIB or in MCCH of the service cell MBSFN area.

The MBSFN enhancements previously described can be applied to multi-cell MBSFN transmissions since the MBSFN configurations and/or transmissions are transparent to the number of cells involved in the transmissions. To form the multi-cell MBSFN transmission cluster, multiple cells can be configured with the same MBSFN area.

UEs associated with cells that are different from a cell serving a Uu-V2V transmitter UE can receive assistance information from the associated UEs' serving cells for control and/or data channels reception. A new neighboring cell information element that can be transmitted in system information can be introduced to inform UEs about neighboring cell system parameters.

The serving cell can provide to the UEs the neighboring cells' system information, which can be acquired by a UE during the cell search procedure and initial system parameters acquisition. A serving cell can provide to a UE a duplexing type parameter, a cyclic prefix type parameter, a system bandwidth parameter, a system frame number of neighboring cells parameter, an uplink-downlink configuration of neighboring cells parameter, and/or a subframe counter of neighboring cells parameter. The subframe counter offset can describe an offset in subframes between the serving cell and/or neighboring cells. If the above parameters are omitted, then the parameters used at the serving cell can be used for the neighboring cells.

If a UE is expected to receive control signaling and data from neighboring cells, then the serving cell can provide the assistance information to a UE for both control and data channel decoding. The possible set of signaled parameters can include an MBSFN configuration, a physical hybrid ARQ indicator channel (PHICH) configuration, a cell specific reference signal (CRS) ports count, a physical cell ID, and a channel state information (CSI) resource configuration. The MBSFN configuration can include MBSFN configuration parameters. The PHICH configuration can include PHICH configuration parameters including a PHICH duration and a number of groups (NG) scaling factor. The CRS port count can include a number of CRS antenna ports for the concerned neighboring cell. The CSI resource configuration can be performed based on a UE zero transmission power.

The list of parameters used to facilitate providing of data from neighboring cells to a UE can include MBSFN configuration parameters, CRS port counts, physical cell IDs, a physical downlink shared channel (PDSCH) parameter, and a CSI resource configuration. The CRS port counts can include the number of CRS antenna ports for the concerned neighboring cell. The PDSCH parameter can include the starting OFDM symbol of a PDSCH for the specific cell. The CSI resource configuration can be performed based on a UE zero transmission power.

Figure 8:
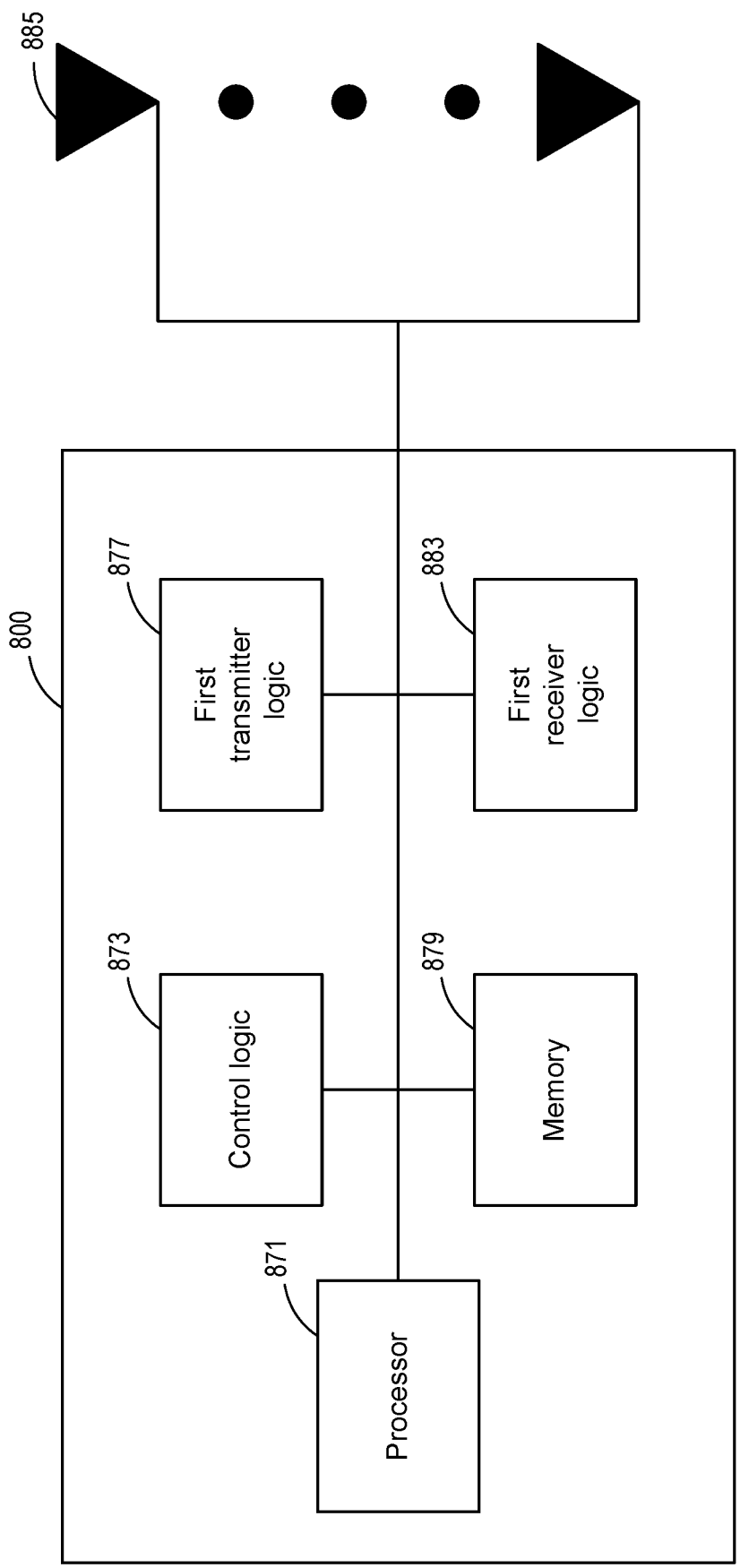
FIG. 8 is a block diagram illustrating electronic device circuitry that may be eNodeB circuitry, user equipment (UE) circuitry, network node circuitry, or some other type of circuitry according to one embodiment.

FIG. 8 is a block diagram illustrating electronic device circuitry that may be eNodeB circuitry, user equipment (UE) circuitry, network node circuitry, or some other type of circuitry according to one embodiment. FIG. 8 illustrates an electronic device 800 that may be, or may be incorporated into or otherwise part of, an eNodeB, a UE, or some other type of electronic device in accordance with various embodiments. Specifically, the electronic device 800 may be logic and/or circuitry that may be at least partially implemented in one or more of hardware, software, and/or firmware. In embodiments, the electronic device logic may include radio transmit/transmitter logic (e.g., a first transmitter logic 877) and receive/receiver logic (e.g., a first receiver logic 883) coupled to a control logic 873 and/or a processor 871. In embodiments, the transmit/transmitter and/or receive/receiver logic may be elements or modules of transceiver logic. The first transmitter logic 877 and the first receiver logic 883 may be housed in separate devices. For example, the first transmitter logic 877 can be incorporated into a first device while the first receiver logic 883 is incorporated into a second device, or the first transmitter logic 877 and the first receiver logic 883 can be incorporated into a device separate from a device including any combination of the control logic 873, a memory 879, and/or the processor 871. The electronic device 800 may be coupled with or include one or more antenna elements 885 of one or more antennas. The electronic device 800 and/or the components of the electronic device 800 may be configured to perform operations similar to those described elsewhere in this disclosure.

In embodiments where the electronic device 800 implements, is incorporated into, or is otherwise part of a UE and/or an eNodeB, or a device portion thereof, the electronic device 800 can generate an extended synchronization signal (ESS). The processor 871 may be coupled to the first receiver and first transmitter. The memory 879 may be coupled to the processor 871 having control logic instructions thereon that, when executed, generate and/or transmit the ESS.

In embodiments where the electronic device 800 receives data, generates data, and/or transmits data to/from a UE to implement a downlink signal including the ESS, the processor 871 may be coupled to a receiver and a transmitter. The memory 879 may be coupled to the processor 871 having the control logic instructions thereon that, when executed, may be able to configure a V2X communication based on geographical location.

As used herein, the term "logic" may refer to, be part of, or include an Application Specific Integrated Circuit (ASIC), an electronic circuit, the processor 871 (shared, dedicated, or group), and/or the memory 879 (shared, dedicated, or group) that execute one or more software or firmware programs, a combinational logic circuit, and/or other suitable hardware components that provide the described functionality. Specifically, the logic may be at least partially implemented in, or an element of, hardware, software, and/or firmware. In some embodiments, the electronic device logic may be implemented in, or functions associated with the logic may be implemented by, one or more software or firmware modules.

Figure 9:
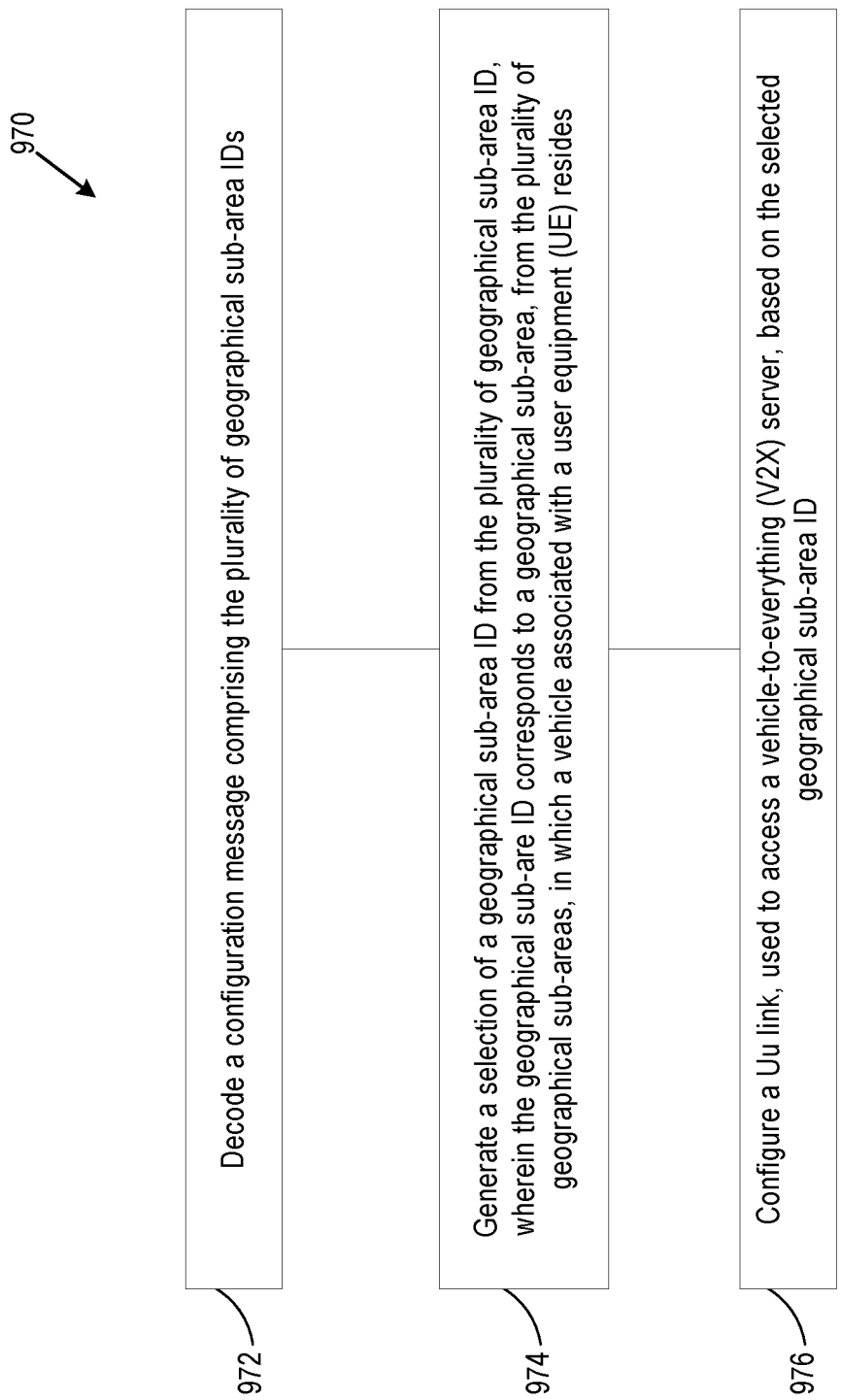
FIG. 9 is a block diagram illustrating a method for V2X communication configuration according to one embodiment.

FIG. 9 is a block diagram illustrating a method 970 for V2X communication configuration according to one embodiment. The method 970 can include decoding 972 a configuration message comprising the plurality of geographical sub-area IDs, generating 974 a selection of a geographical sub-area ID from the plurality of geographical sub-area ID, wherein the geographical sub-area ID corresponds to a geographical sub-area, from the plurality of geographical sub-areas, in which a vehicle associated with a UE resides, and configuring 976 a Uu link, used to access a V2X server, based on the selected geographical sub-area ID The method 970 can also include monitoring eNodeBs that are associated with the selected geographical sub-area. The method 970 can also include monitoring geographical services radio network temporary identifiers (G-RNTIs) that serve the selected geographical sub-area. The method 970 can also include processing spectrum resources that are associated with the selected geographical sub-area. The spectrum resources can include at least one of subframe sets and transmission schedules. The method 970 can also include processing a search space that is associated with the selected geographical sub-area.

Figure 10:
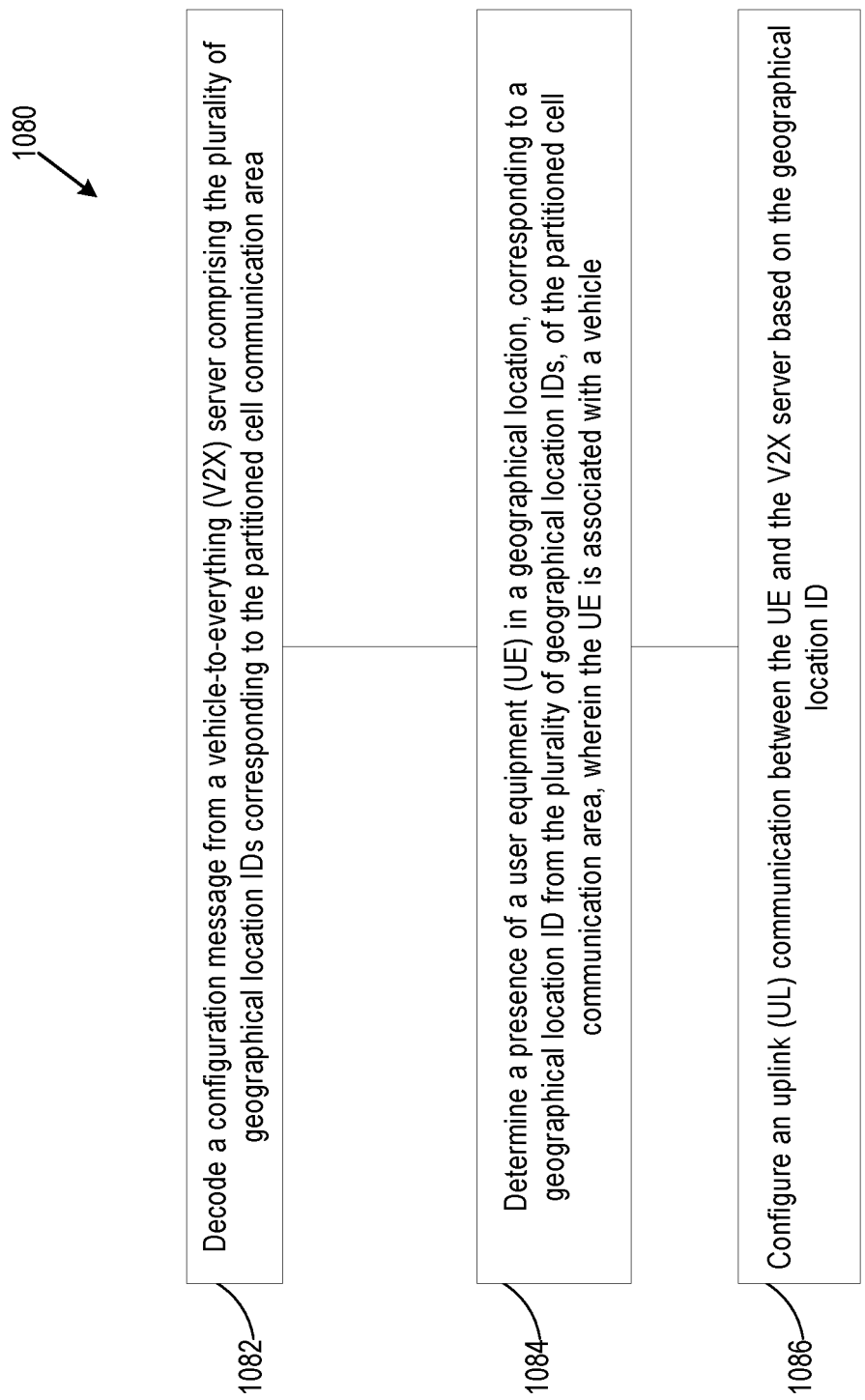
FIG. 10 is a block diagram illustrating a method for V2X communication configuration according to one embodiment.

FIG. 10 is a block diagram illustrating a method 1080 for V2X communication configuration according to one embodiment. The method 1080 can include decoding 1082 a Uu link, used to access a V2X server, based on the selected geographical sub-area ID, determining 1084 a presence of a UE in a geographical location, corresponding to a geographical location ID from the plurality of geographical location IDs, of the partitioned cell communication area, wherein the UE is associated with a vehicle, and configuring 1086 an UL communication between the UE and the V2X server based on the geographical location ID.

The geographical location can include at least one of a geographical area and a geographical sub-area in which the vehicle associated with the UE resides. The partition cell communication area can be generated for the UE.

The method 1080 can also include decoding data provided via a PMCH and an application layer of the UE, the data comprising a geographical sub-area ID corresponding to a geographical sub-area, from the geographical sub-areas, in which the vehicle associated with the UE resides. The method 1080 can also include decoding at least one of an MAC element, a RRC message, a SIB message, an MBSFN message, and an SC-PTM message provided by the UE to determine a geographical sub-area ID corresponding to a geographical sub-area, from the geographical sub-areas, in which the vehicle associated with the UE resides. The V2X server can be an eNodeB.

FIG. 11 is a block diagram illustrating a method 1190 for V2X communication configuration according to one embodiment. The method 1190 can include storing 1192 a plurality of geographical sub-area IDs corresponding to a plurality of geographical sub-areas of a partitioned cell communication area, decoding 1194 a configuration message from a UE comprising a geographical sub-area ID corresponding to a selection of a geographical sub-area from the geographical sub-areas in which a vehicle associated with the UE resides, and configuring 1196 at least one of a DL communication and an UL communication between the UE and the eNodeB based on the selected geographical sub-area ID.

The method 1190 can also include configuring the UL communication between the UE and the eNodeB are further configured to select the eNodeB for UL communication based on the selected geographical sub-area. The method 1190 can also include configuring the UL communication between the UE and the eNodeB are further configured to configure UL scheduling and inter-cell UL resource partitioning. The method 1190 can further include configuring the UL communication between the UE and the eNodeB are further configured to associate measurements with the selected geographical sub-area. The method 1190 can further include configuring the DL communication between the UE and the eNodeB are further configured to provide at least one of geographical specific broadcast services and geographical specific groupcast services.

The at least one of geographical specific broadcast services and geographical specific groupcast services can comprise enhancements for DL transmission including geographical specific radio network temporary identifier (RNTI) allocation, determination of a geographical sub-area ID of a UE transmitter, inter-cell coordination of a broadcast transmission schedule, and enhancements for DL reception. The enhancements for DL reception can include at least assistance information for a DL transmission schedule and association of geographical sub-area IDs with cell IDs, a SC-PTM transmission schedule, and G-RNTIs.

Figure 12:
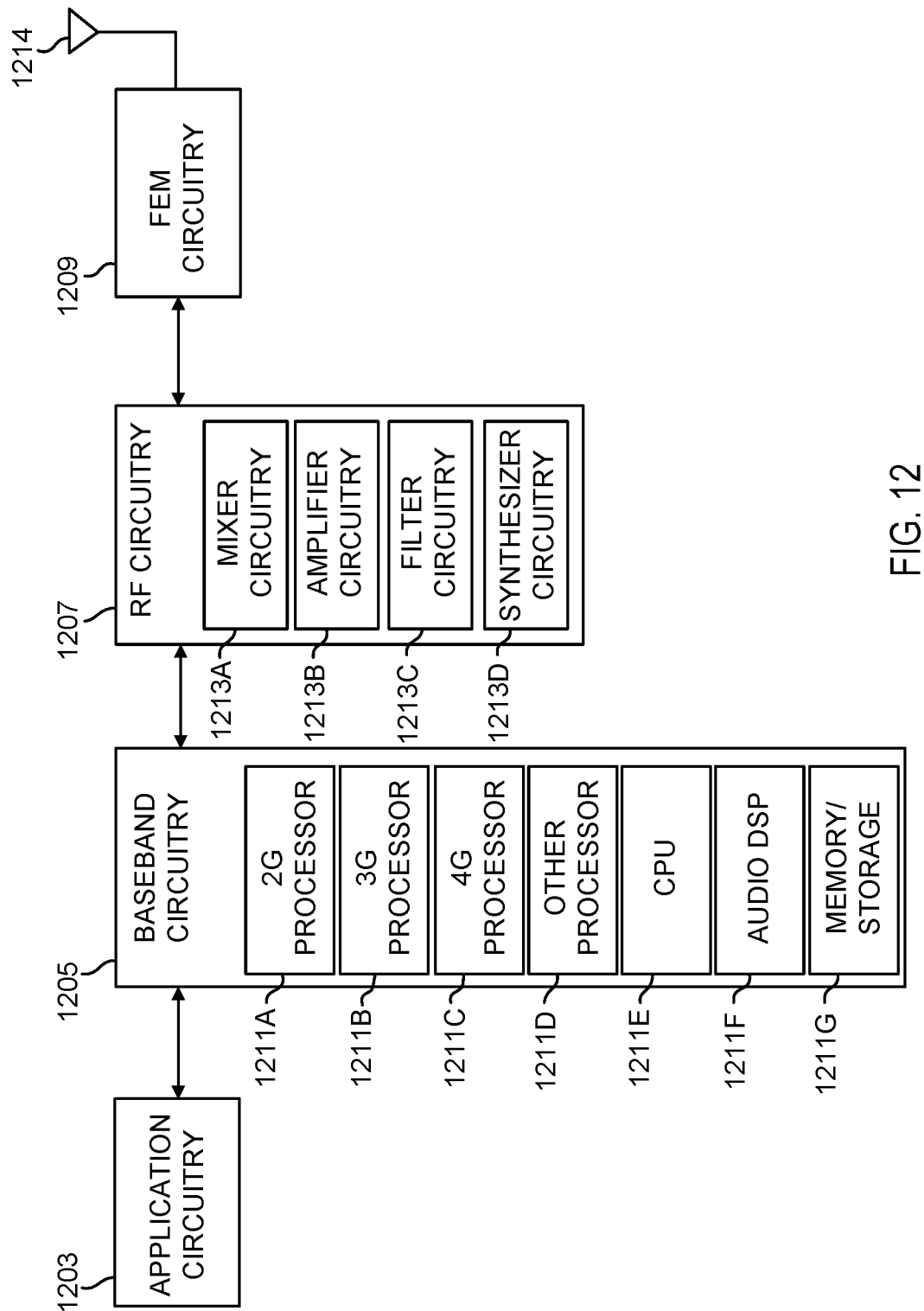
FIG. 12 is a block diagram illustrating components of a device according to one embodiment.

FIG. 12 is a block diagram illustrating components of a device according to one embodiment. In some embodiments, the device may include application circuitry 1203, baseband circuitry 1205, Radio Frequency (RF) circuitry 1207, front-end module (FEM) circuitry 1209, and one or more antennas 1214, coupled together at least as shown in FIG. 12. Any combination or subset of these components can be included, for example, in a UE device or an eNodeB device.

The application circuitry 1203 may include one or more application processors. By way of non-limiting example, the application circuitry 1203 may include one or more single-core or multi-core processors. The processor(s) may include any combination of general-purpose processors and dedicated processors (e.g., graphics processors, application processors, etc.). The processor(s) may be operably coupled and/or include memory/storage, and may be configured to execute instructions stored in the memory/storage to enable various applications and/or operating systems to run on the system.

By way of non-limiting example, the baseband circuitry 1205 may include one or more single-core or multi-core processors. The baseband circuitry 1205 may include one or more baseband processors and/or control logic. The baseband circuitry 1205 may be configured to process baseband signals received from a receive signal path of the RF circuitry 1207. The baseband circuitry 1205 may also be configured to generate baseband signals for a transmit signal path of the RF circuitry 1207. The baseband circuitry 1205 may interface with the application circuitry 1203 for generation and processing of the baseband signals, and for controlling operations of the RF circuitry 1207.

By way of non-limiting example, the baseband circuitry 1205 may include at least one of a second generation (2G) baseband processor 1211A, a third generation (3G) baseband processor 1211B, a fourth generation (4G) baseband processor 1211C, and other baseband processor(s) 1211D for other existing generations and generations in development or to be developed in the future (e.g., fifth generation (5G), 6G, etc.). The baseband circuitry 1205 (e.g., at least one of the baseband processors 1211A-1211D) may handle various radio control functions that enable communication with one or more radio networks via the RF circuitry 1207. By way of non-limiting example, the radio control functions may include signal modulation/demodulation, encoding/decoding, radio frequency shifting, other functions, and combinations thereof. In some embodiments, modulation/demodulation circuitry of the baseband circuitry 1205 may be programmed to perform Fast-Fourier Transform (FFT), precoding, constellation mapping/demapping functions, other functions, and combinations thereof. In some embodiments, encoding/decoding circuitry of the baseband circuitry 1205 may be programmed to perform convolutions, tail-biting convolutions, turbo, Viterbi, Low Density Parity Check (LDPC) encoder/decoder functions, other functions, and combinations thereof. Embodiments of modulation/demodulation and encoder/decoder functions are not limited to these examples, and may include other suitable functions.

In some embodiments, the baseband circuitry 1205 may include elements of a protocol stack. By way of non-limiting example, elements of an evolved universal terrestrial radio access network (E-UTRAN) protocol include, for example, physical (PHY), media access control (MAC), radio link control (RLC), packet data convergence protocol (PDCP), and/or radio resource control (RRC) elements. A central processing unit (CPU) 1211E of the baseband circuitry 1205 may be programmed to run elements of the protocol stack for signaling of the PHY, MAC, RLC, PDCP and/or RRC layers. In some embodiments, the baseband circuitry 1205 may include one or more audio digital signal processor(s) (DSP) 1211F. The audio DSP(s) 1211F may include elements for compression/decompression and echo cancellation. The audio DSP(s) 1211F may also include other suitable processing elements.

The baseband circuitry 1205 may further include a memory/storage 1211G. The memory/storage 1211G may include data and/or instructions for operations performed by the processors of the baseband circuitry 1205 stored thereon. In some embodiments, the memory/storage 1211G may include any combination of suitable volatile memory and/or non-volatile memory. The memory/storage 1211G may also include any combination of various levels of memory/storage including, but not limited to, read-only memory (ROM) having embedded software instructions (e.g., firmware), random access memory (e.g., dynamic random access memory (DRAM)), caches, buffers, etc. In some embodiments, the memory/storage 1211G may be shared among the various processors or dedicated to particular processors.

Components of the baseband circuitry 1205 may be suitably combined in a single chip or a single chipset, or disposed on a same circuit board in some embodiments. In some embodiments, some or all of the constituent components of the baseband circuitry 1205 and the application circuitry 1203 may be implemented together, such as, for example, on a system on a chip (SOC).

In some embodiments, the baseband circuitry 1205 may provide for communication compatible with one or more radio technologies. For example, in some embodiments, the baseband circuitry 1205 may support communication with an evolved universal terrestrial radio access network (E-UTRAN) and/or other wireless metropolitan area networks (WMAN), a wireless local area network (WLAN), or a wireless personal area network (WPAN). Embodiments in which the baseband circuitry 1205 is configured to support radio communications of more than one wireless protocol may be referred to as multi-mode baseband circuitry.

The RF circuitry 1207 may enable communication with wireless networks using modulated electromagnetic radiation through a non-solid medium. In various embodiments, the RF circuitry 1207 may include switches, filters, amplifiers, etc., to facilitate the communication with the wireless network. The RF circuitry 1207 may include a receive signal path, which may include circuitry to down-convert RF signals received from the FEM circuitry 1209, and provide baseband signals to the baseband circuitry 1205. The RF circuitry 1207 may also include a transmit signal path, which may include circuitry to up-convert baseband signals provided by the baseband circuitry 1205, and provide RF output signals to the FEM circuitry 1209 for transmission.

In some embodiments, the RF circuitry 1207 may include a receive signal path and a transmit signal path. The receive signal path of the RF circuitry 1207 may include a mixer circuitry 1213A, an amplifier circuitry 1213B, and a filter circuitry 1213C. The transmit signal path of the RF circuitry 1207 may include the filter circuitry 1213C and the mixer circuitry 1213A. The RF circuitry 1207 may further include a synthesizer circuitry 1213D configured to synthesize a frequency for use by the mixer circuitry 1213A of the receive signal path and the transmit signal path. In some embodiments, the mixer circuitry 1213A of the receive signal path may be configured to down-convert RF signals received from the FEM circuitry 1209 based on the synthesized frequency provided by the synthesizer circuitry 1213D. The amplifier circuitry 1213B may be configured to amplify the down-converted signals.

The filter circuitry 1213C may include a low-pass filter (LPF) or band-pass filter (BPF) configured to remove unwanted signals from the down-converted signals to generate output baseband signals. Output baseband signals may be provided to the baseband circuitry 1205 for further processing. In some embodiments, the output baseband signals may include zero-frequency baseband signals, although this is not a requirement. In some embodiments, the mixer circuitry 1213A of the receive signal path may comprise passive mixers, although the scope of the embodiments is not limited in this respect.

In some embodiments, the mixer circuitry 1213A of the transmit signal path may be configured to up-convert input baseband signals based on the synthesized frequency provided by the synthesizer circuitry 1213D to generate RF output signals for the FEM circuitry 1209. The baseband signals may be provided by the baseband circuitry 1205 and may be filtered by the filter circuitry 1213C. The filter circuitry 1213C may include a low-pass filter (LPF), although the scope of the embodiments is not limited in this respect.

In some embodiments, the mixer circuitry 1213A of the receive signal path and the mixer circuitry 1213A of the transmit signal path may include two or more mixers, and may be arranged for quadrature downconversion and/or upconversion, respectively. In some embodiments, the mixer circuitry 1213A of the receive signal path and the mixer circuitry 1213A of the transmit signal path may include two or more mixers and may be arranged for image rejection (e.g., Hartley image rejection). In some embodiments, the mixer circuitry 1213A of the receive signal path and the mixer circuitry 1213A of the transmit signal path may be arranged for direct downconversion and/or direct upconversion, respectively. In some embodiments, the mixer circuitry 1213A of the receive signal path and the mixer circuitry 1213A of the transmit signal path may be configured for super-heterodyne operation.

In some embodiments, the output baseband signals and the input baseband signals may be analog baseband signals, although the scope of the embodiments is not limited in this respect. In some alternative embodiments, the output baseband signals and the input baseband signals may be digital baseband signals. In such embodiments, the RF circuitry 1207 may include analog-to-digital converter (ADC) and digital-to-analog converter (DAC) circuitry, and the baseband circuitry 1205 may include a digital baseband interface to communicate with the RF circuitry 1207.

In some dual-mode embodiments, separate radio interference cancellation (IC) circuitry may be provided for processing signals for each spectrum, although the scope of the embodiments is not limited in this respect.

In some embodiments, the synthesizer circuitry 1213D may include one or more of a fractional-N synthesizer and a fractional N/N+1 synthesizer, although the scope of the embodiments is not limited in this respect, as other types of frequency synthesizers may be suitable. For example, the synthesizer circuitry 1213D may include a delta-sigma synthesizer, a frequency multiplier, a synthesizer comprising a phase-locked loop with a frequency divider, other synthesizers, and combinations thereof.

The synthesizer circuitry 1213D may be configured to synthesize an output frequency for use by the mixer circuitry 1213A of the RF circuitry 1207 based on a frequency input and a divider control input. In some embodiments, the synthesizer circuitry 1213D may be a fractional N/N+1 synthesizer.

In some embodiments, frequency input may be provided by a voltage controlled oscillator (VCO), although that is not a requirement. Divider control input may be provided by either the baseband circuitry 1205 or the application circuitry 1203 depending on the desired output frequency. In some embodiments, a divider control input (e.g., N) may be determined from a look-up table based on a channel indicated by the application circuitry 1203.

The synthesizer circuitry 1213D of the RF circuitry 1207 may include a divider, a delay-locked loop (DLL), a multiplexer, and a phase accumulator. In some embodiments, the divider may include a dual modulus divider (DMD), and the phase accumulator may include a digital phase accumulator (DPA). In some embodiments, the DMD may be configured to divide the input signal by either N or N+1 (e.g., based on a carry-out) to provide a fractional division ratio. In some example embodiments, the DLL may include a set of cascaded, tunable, delay elements; a phase detector; a charge pump; and a D-type flip-flop. In such embodiments, the delay elements may be configured to break a VCO period up into Nd equal packets of phase, where Nd is the number of delay elements in the delay line. In this way, the DLL may provide negative feedback to help ensure that the total delay through the delay line is one VCO cycle.

In some embodiments, the synthesizer circuitry 1213D may be configured to generate a carrier frequency as the output frequency. In some embodiments, the output frequency may be a multiple of the carrier frequency (e.g., twice the carrier frequency, four times the carrier frequency, etc.) and used in conjunction with a quadrature generator and divider circuitry to generate multiple signals at the carrier frequency with multiple different phases with respect to each other. In some embodiments, the output frequency may be an LO frequency (fLO). In some embodiments, the RF circuitry 1207 may include an IQ/polar converter.

The FEM circuitry 1209 may include a receive signal path, which may include circuitry configured to operate on RF signals received from the one or more antennas 1214, amplify the received signals, and provide the amplified versions of the received signals to the RF circuitry 1207 for further processing. The FEM circuitry 1209 may also include a transmit signal path, which may include circuitry configured to amplify signals for transmission provided by the RF circuitry 1207 for transmission by at least one of the one or more antennas 1214.

In some embodiments, the FEM circuitry 1209 may include a TX/RX switch configured to switch between a transmit mode and a receive mode operation. The FEM circuitry 1209 may include a receive signal path and a transmit signal path. The receive signal path of the FEM circuitry 1209 may include a low-noise amplifier (LNA) to amplify received RF signals and provide the amplified received RF signals as an output (e.g., to the RF circuitry 1207). The transmit signal path of the FEM circuitry 1209 may include a power amplifier (PA) configured to amplify input RF signals (e.g., provided by the RF circuitry 1207), and one or more filters configured to generate RF signals for subsequent transmission (e.g., by the one or more antennas 1214).

In some embodiments, the device may include additional elements such as, for example, memory/storage, a display, a camera, one of more sensors, an input/output (I/O) interface, other elements, and combinations thereof.

In some embodiments, the device may be configured to perform one or more processes, techniques, and/or methods as described herein, or portions thereof.

Figure 13:
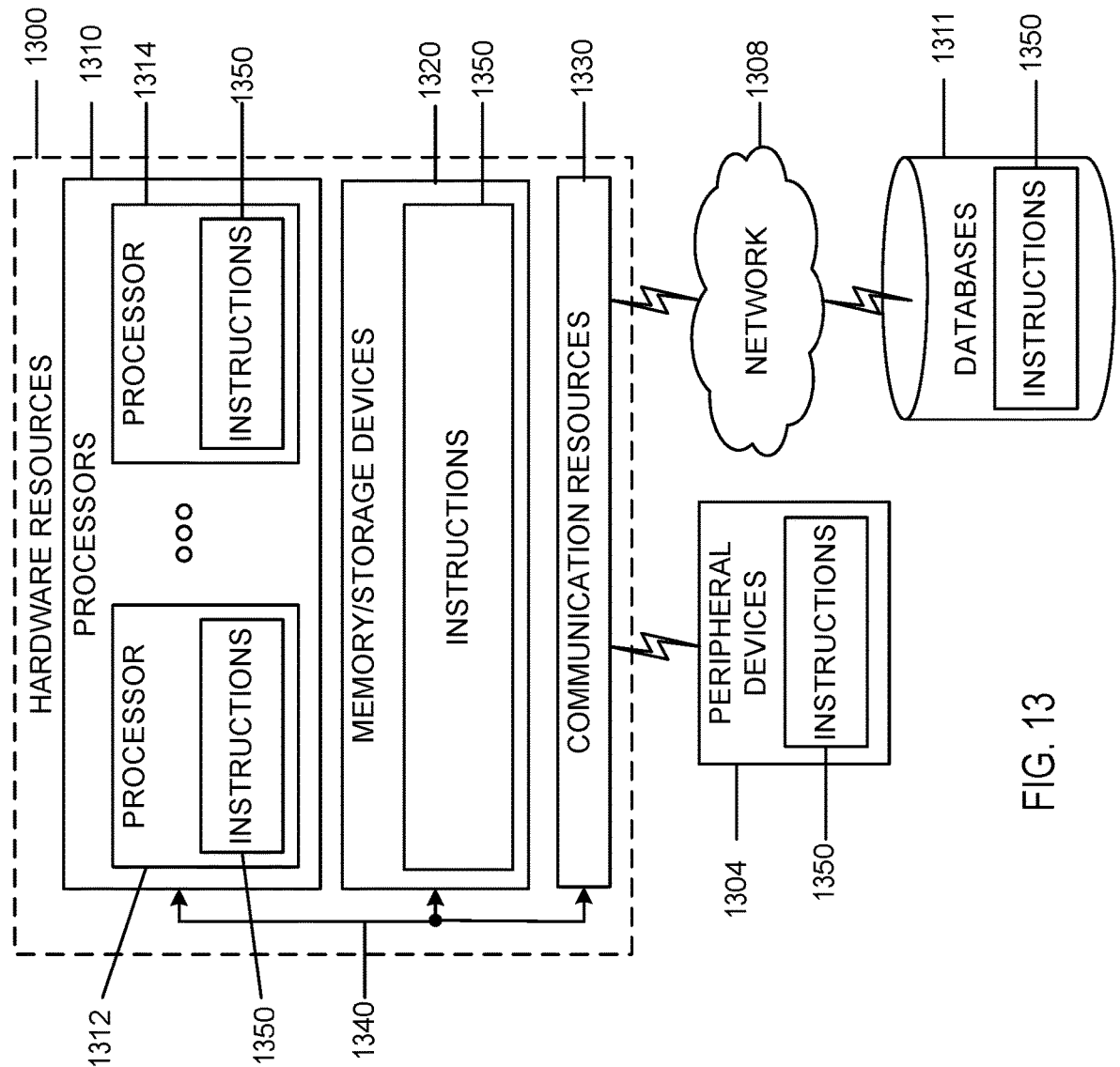
FIG. 13 is a block diagram illustrating components according to some embodiments.

FIG. 13 is a block diagram illustrating components according to some embodiments. Specifically, FIG. 13 shows a diagrammatic representation of hardware resources 1300 including one or more processors (or processor cores) 1310, one or more memory/storage devices 1320, and one or more communication resources 1330, all of which are communicatively coupled via a bus 1340.

The processors 1310 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1312 and a processor 1314. The memory/storage devices 1320 may include main memory, disk storage, or any suitable combination thereof.

The communication resources 1330 may include interconnection and/or network interface components or other suitable devices to communicate with one or more peripheral devices 1304 and/or one or more databases 1311 via a network 1308. For example, the communication resources 1330 may include wired communication components (e.g., for coupling via a Universal Serial Bus (USB)), cellular communication components, Near Field Communication (NFC) components, Bluetooth® components (e.g., Bluetooth® Low Energy), Wi-Fi® components, and other communication components.

Instructions 1350 may comprise software, a program, an application, an applet, an app, or other executable code for causing at least one of the processors 1310 to perform any one or more of the methodologies discussed herein. The instructions 1350 may reside, completely or partially, within at least one of the processors 1310 (e.g., within the processor's cache memory), the memory/storage devices 1320, or any suitable combination thereof. Furthermore, any portion of the instructions 1350 may be transferred to the hardware resources 1300 from any combination of the peripheral devices 1304 and/or the databases 1311. Accordingly, the memory of the processors 1310, the memory/storage devices 1320, the peripheral devices 1304, and the databases 1311 are examples of computer-readable and machine-readable media.

EXAMPLE EMBODIMENTS

Example 1 is an apparatus for a user equipment (UE). The apparatus includes electronic memory to store a variety of geographical sub-area identifiers (IDs) corresponding to a variety of geographical sub-areas of a partitioned cell communication area. The apparatus includes one or more baseband processors designed to decode a configuration message including the variety of geographical sub-area IDs. The apparatus also includes one or more baseband processors designed to generate a selection of a geographical sub-area ID from the variety of geographical sub-area ID, where the geographical sub-area ID corresponds to a geographical sub-area, from the variety of geographical sub-areas, in which a vehicle associated with a user equipment (UE) resides. The apparatus includes one or more baseband processors designed to configure a Uu link, used to access a vehicle-to-everything (V2X) server, based on the selected geographical sub-area ID.

Example 2 is the device of Example 1, where the one or more baseband processors designed to generate the selection of the geographical sub-area ID are further designed to determine a number of geographical coordinates, of the UE, provided by a tracking application of the UE.

Example 3 is the device of Example 3, where the one or more baseband processors designed to generate the selection of the geographical sub-area ID are further designed to select the geographical sub-area ID in which the geographical coordinates reside.

Example 4 is the device of Example 1, where the one or more baseband processors designed to configure the Uu link between the UE and the V2X server based on the selected geographical sub-area ID are further designed to monitor evolved node Bs (eNodeBs) that are associated with the selected geographical sub-area ID.

Example 5 is the device of Example 1, where the one or more baseband processors designed to configure the Uu link between the UE and the V2X server based on the selected geographical sub-area ID are further designed to monitor geographical services radio network temporary identifiers (G-RNTIs) that serve the selected geographical sub-area ID.

Example 6 is the device of Example 1, where the one or more baseband processors designed to configure the Uu link between the UE and the V2X server based on the selected geographical sub-area ID are further designed to process spectrum resources that are associated with the selected geographical sub-area ID.

Example 7 is the device of Example 6, where the spectrum resources include at least one of subframe sets and transmission schedules.

Example 8 is the device of Example 1, where the one or more baseband processors designed to configure the Uu link between the UE and the V2X server based on the selected geographical sub-area ID are further designed to process a search space that is associated with the selected geographical sub-area ID.

Example 9 is an apparatus for an eNodeB. The apparatus includes electronic memory to store a variety of geographical location identifiers (IDs) corresponding to a variety of geographical locations of a partitioned cell communication area. The apparatus includes one or more processors designed to decode a configuration message from a vehicle-to-everything (V2X) server including the variety of geographical location IDs corresponding to the partitioned cell communication area. The apparatus includes one or more processors designed to determine a presence of a user equipment (UE) in a geographical location, corresponding to a geographical location ID from the variety of geographical location IDs, of the partitioned cell communication area, where the UE is associated with a vehicle, and configure an uplink (UL) communication between the UE and the V2X server based on the geographical location ID.

Example 10 is the apparatus of Example 9, where the geographical location includes at least one of a geographical area and a geographical sub-area in which the vehicle associated with the UE resides.

Example 11 is the apparatus of Example 9, where the partition cell communication area is generated for the UE.

Example 12 is the apparatus of Example 9, where the one or more processors are further designed to decode data provided via a physical multicast channel (PMCH) and an application layer of the UE, the data including the geographical sub-area ID corresponding to a geographical sub-area, from the geographical sub-areas, in which the vehicle associated with the UE resides.

Example 13 is the apparatus of Example 9, where the one or more processors are further designed to decode at least one of a medium access control (MAC) element, a radio resource controller (RRC) message, a system information block (SIB) message, a multicast broadcast single frequency network (MBSFN) message, and a single cell point-to-multipoint (SC-PTM) message provided by the UE to determine the geographical sub-area ID corresponding to a geographical sub-area, from the geographical sub-areas, in which the vehicle associated with the UE resides.

Example 14 is the apparatus of Example 9, where the V2X server is an evolved node B (eNodeB).

Example 15 is a computer-readable storage medium. The computer-readable storage medium having stored thereon instructions that, when implemented by a computing device, cause the computing device to store a variety of geographical sub-area identifiers (IDs) corresponding to a variety of geographical sub-areas of a partitioned cell communication area. The computer-readable storage medium having stored thereon instructions that, when implemented by a computing device, cause the computing device to decode a configuration message from a user equipment (UE) including a geographical sub-area ID corresponding to a selection of a geographical sub-area from the geographical sub-areas in which a vehicle associated with the UE resides, and design at least one of a downlink (DL) communication and an uplink (UL) communication between the UE and the eNodeB based on the selected geographical sub-area ID.

Example 16 is the computer-readable storage medium of Example 15, where the instructions to design the at least one of the communication and the UL communication further include instruction to select the eNodeB for UL communication based on the selected geographical sub-area ID.

Example 17 is the computer-readable storage medium of Example 15, where the instructions to design the at least one of the communication and the UL communication further include instruction to configure UL scheduling and inter-cell UL resource partitioning.

Example 18 is the computer-readable storage medium as in Examples 15, 16, or 17, where the instructions to design the at least one of the communication and the UL communication further include instruction to associate measurements with the selected geographical sub-area ID.

Example 19 is the computer-readable storage medium as in Examples 15, 16, or 17, where the instructions to design the at least one of the communication and the UL communication further include instruction to provide at least one of geographical specific broadcast services and geographical specific groupcast services.

Example 20 is the computer-readable storage medium of Example 19, where the at least one of geographical specific broadcast services and geographical specific groupcast services include enhancements for DL transmission including geographical specific radio network temporary identifier (RNTI) allocation, determination of a geographical sub-area ID of a UE transmitter, inter-cell coordination of a broadcast transmission schedule, and enhancements for DL reception.

Example 21 is the computer-readable storage medium of Example 20, where the enhancements for DL reception include at least assistance information for a DL transmission schedule, and association of geographical sub-area IDs with cell IDs, a single cell point-to-multipoint (SC-PTM) transmission schedule, and geographical services radio network temporary identifiers (G-RNTIs).

Example 22 is a method. The method includes decoding a configuration message including the variety of geographical sub-area identifiers (IDs) corresponding to a variety of geographical sub-areas of a partitioned cell communication area. The method includes generating a selection of a geographical sub-area ID from the variety of geographical sub-area ID, where the geographical sub-area ID corresponds to a geographical sub-area, from the variety of geographical sub-areas, in which a vehicle associated with a user equipment (UE) resides. The method also includes configuring a Uu link, used to access a vehicle-to-everything (V2X) server, based on the selected geographical sub-area ID.

Example 23 is the method of Example 22, where generating the selection of the geographical sub-area ID further includes determining a number of geographical coordinates, of the UE, provided by a tracking application of the UE.

Example 24 is the method of Example 23, where generating the selection of the geographical sub-area ID further includes selecting the geographical sub-area ID in which the geographical coordinates reside.

Example 25 is the method of Example 22, where configuring the Uu link between the UE and the V2X server based on the selected geographical sub-area ID further includes monitoring evolved node Bs (eNodeBs) that are associated with the selected geographical sub-area ID.

Example 26 is the method of Example 22, where configuring the Uu link between the UE and the V2X server based on the selected geographical sub-area ID further includes monitoring geographical services radio network temporary identifiers (G-RNTIs) that serve the selected geographical sub-area ID.

Example 27 is the method of Example 22, where configuring the Uu link between the UE and the V2X server based on the selected geographical sub-area ID further includes processing spectrum resources that are associated with the selected geographical sub-area ID.

Example 28 is the method of Example 27, where the spectrum resources include at least one of subframe sets and transmission schedules.

Example 29 is the method of Example 22, where configuring the Uu link between the UE and the V2X server based on the selected geographical sub-area ID further includes processing a search space that is associated with the selected geographical sub-area ID.

Example 30 is a method. The method includes decoding a configuration message from a vehicle-to-everything (V2X) server including the variety of geographical location identifiers (IDs) corresponding to a variety of geographical locations of a partitioned cell communication area. The method includes determining a presence of a user equipment (UE) in a geographical location, corresponding to a geographical location ID from the variety of geographical location IDs, of the partitioned cell communication area, where the UE is associated with a vehicle, and configuring an uplink (UL) communication between the UE and the V2X server based on the geographical location ID.

Example 31 is the method of Example 30, where the geographical location includes at least one of a geographical area and a geographical sub-area in which the vehicle associated with the UE resides.

Example 32 is the method of Example 30, where the partition cell communication area is generated for the UE.

Example 33 is the method of Example 30, further including decoding data provided via a physical multicast channel (PMCH) and an application layer of the UE, the data including the geographical sub-area ID corresponding to a geographical sub-area, from the geographical sub-areas, in which the vehicle associated with the UE resides.

Example 34 is the method of Example 30, further including decoding at least one of a medium access control (MAC) element, a radio resource controller (RRC) message, a system information block (SIB) message, a multicast broadcast single frequency network (MBSFN) message, and a single cell point-to-multipoint (SC-PTM) message provided by the UE to determine the geographical sub-area ID corresponding to a geographical sub-area, from the geographical sub-areas, in which the vehicle associated with the UE resides.

Example 35 is the method of Example 30, where the V2X server is an evolved node B (eNodeB).

Example 36 is a method. The method includes storing a variety of geographical sub-area identifiers (IDs) corresponding to a variety of geographical sub-areas of a partitioned cell communication area. The method includes decoding a configuration message from a user equipment (UE) including a geographical sub-area ID corresponding to a selection of a geographical sub-area from the geographical sub-areas in which a vehicle associated with the UE resides. The method also includes configuring at least one of a downlink (DL) communication and an uplink (UL) communication between the UE and the eNodeB based on the selected geographical sub-area ID.

Example 37 is the method of Example 36, where designing at least one of the communication and the UL communication further includes selecting the eNodeB for UL communication based on the selected geographical sub-area ID.

Example 38 is the method of Example 36, where designing at least one of the communication and the UL communication further includes configuring UL scheduling and inter-cell UL resource partitioning.

Example 39 is the method of Example 36, where designing at least one of the communication and the UL communication further includes associating measurements with the selected geographical sub-area ID.

Example 40 is the method of Example 36, where designing at least one of the communication and the UL communication further includes providing at least one of geographical specific broadcast services and geographical specific groupcast services.

Example 41 is the method of Example 40, where the at least one of geographical specific broadcast services and geographical specific groupcast services includes enhancements for DL transmission including geographical specific radio network temporary identifier (RNTI) allocation, determination of a geographical sub-area ID of a UE transmitter, inter-cell coordination of a broadcast transmission schedule, and enhancements for DL reception.

Example 42 is the method of Example 41, where the enhancements for DL reception include at least assistance information for a DL transmission schedule, and association of geographical sub-area IDs with cell IDs, a single cell point-to-multipoint (SC-PTM) transmission schedule, and geographical services radio network temporary identifiers (G-RNTIs).

Example 43 is at least one computer-readable storage medium having stored thereon computer-readable instructions, when executed, to implement a method as exemplified in any of Examples 22-42.

Example 44 is an apparatus including a method to perform a method as exemplified in any of Examples 22-42.

Example 45 is a means for performing a method as exemplified in any of Examples 22-42.

Various techniques, or certain aspects or portions thereof, may take the form of program code (i.e., instructions)

embodied in tangible media, such as floppy diskettes, CD-ROMs, hard drives, a non-transitory computer-readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or another medium for storing electronic data. The eNodeB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or an interpreted language, and combined with hardware implementations.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Reference throughout this specification to "an example" means that a particular feature, structure, or characteristic described in connection with the example is included in at least one embodiment. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples may be referred to herein along with alternatives for the various components thereof. It is understood that such embodiments, examples, and alternatives are not to be construed as de facto equivalents of one another, but are to be considered as separate and autonomous representations of embodiments.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the embodiments are not to be limited to the details given herein, but may be modified within the scope and equivalents of the appended claims.

The invention claimed is:

1. An apparatus for a user equipment (UE), comprising:
   electronic memory to store a plurality of geographical sub-area identifiers (IDs) corresponding to a plurality of geographical sub-areas of a partitioned cell communication area; and
   one or more baseband processors configured to:
      decode a configuration message comprising the plurality of geographical sub-area IDs and a transmission schedule associated with a plurality of cell IDs and the plurality of geographical sub-area IDs, wherein the transmission schedule corresponds to inter-cell muting applied across different sets of subframes;
      generate a selection of a geographical sub-area ID from the plurality of geographical sub-area ID, wherein the geographical sub-area ID corresponds to a geographical sub-area, from the plurality of geographical sub-areas, in which a vehicle associated with a user equipment (UE) resides; and
      configure a Uu link, used to access a vehicle-to-everything (V2X) server, based on the selected geographical sub-area ID and one or more subframes of the different sets of subframes corresponding to the selected geographical sub-area ID.

2. The apparatus of claim 1, wherein the one or more baseband processors configured to generate the selection of the geographical sub-area ID are further configured to determine a number of geographical coordinates, of the UE, provided by a tracking application of the UE.

3. The apparatus of claim 2, wherein the one or more baseband processors configured to generate the selection of the geographical sub-area ID are further configured to select the geographical sub-area ID in which the geographical coordinates reside.

4. The apparatus of claim 1, wherein the one or more baseband processors configured to configure the Uu link between the UE and the V2X server based on the selected geographical sub-area ID are further configured to monitor evolved node Bs (eNodeBs) that are associated with the selected geographical sub-area ID.

5. The apparatus of claim 1, wherein the one or more baseband processors configured to configure the Uu link between the UE and the V2X server based on the selected geographical sub-area ID are further configured to monitor geographical services radio network temporary identifiers (G-RNTIs) that serve the selected geographical sub-area ID.

6. The apparatus of claim 1, wherein the one or more baseband processors configured to configure the Uu link between the UE and the V2X server based on the selected geographical sub-area ID are further configured to process spectrum resources that are associated with the selected geographical sub-area ID.

7. The apparatus of claim 6, wherein the spectrum resources include at least one of subframe sets and transmission schedules.

8. The apparatus of claim 1, wherein the one or more baseband processors configured to configure the Uu link between the UE and the V2X server based on the selected geographical sub-area ID are further configured to process a search space that is associated with the selected geographical sub-area ID.

9. An apparatus for an eNodeB, comprising:
electronic memory to store a plurality of geographical location identifiers (IDs) corresponding to a plurality of geographical locations of a partitioned cell communication area; and
one or more processors configured to:
decode a configuration message from a vehicle-to-everything (V2X) server, the configuration message comprising the plurality of geographical location IDs corresponding to the partitioned cell communication area and a transmission schedule associated with a plurality of cell IDs and the plurality of geographical location IDs, wherein the transmission schedule corresponds to inter-cell muting applied across different sets of subframes;
determine a presence of a user equipment (UE) in a geographical location, corresponding to a geographical location ID from the plurality of geographical location IDs, of the partitioned cell communication area, wherein the UE is associated with a vehicle; and
configure an uplink (UL) communication between the UE and the V2X server based on the geographical location ID and one or more subframes of the different sets of subframes corresponding to the geographical location ID.

10. The apparatus of claim 9, wherein the geographical location includes at least one of a geographical area and a geographical sub-area in which the vehicle associated with the UE resides.

11. The apparatus of claim 9, wherein the partition cell communication area is generated for the UE.

12. The apparatus of claim 9, wherein the one or more processors are further configured to decode data provided via a physical multicast channel (PMCH) and an application layer of the UE, the data comprising a geographical sub-area ID corresponding to a geographical sub-area, from the plurality of geographical locations, in which the vehicle associated with the UE resides.

13. The apparatus of claim 9, wherein the one or more processors are further configured to decode at least one of a medium access control (MAC) element, a radio resource controller (RRC) message, a system information block (SIB) message, a multicast broadcast single frequency network (MBSFN) message, and a single cell point-to-multipoint (SC-PTM) message provided by the UE to determine a geographical sub-area ID corresponding to a geographical sub-area, from the plurality of geographical locations, in which the vehicle associated with the UE resides.

14. The apparatus of claim 9, wherein the V2X server is an evolved node B (eNodeB).

15. A computer-readable storage medium having stored thereon instructions that, when implemented by a computing device, cause the computing device to:
store a plurality of geographical sub-area identifiers (IDs) corresponding to a plurality of geographical sub-areas of a partitioned cell communication area;
decode a configuration message from a user equipment (UE) comprising a geographical sub-area ID corresponding to a selection of a geographical sub-area from the geographical sub-areas in which a vehicle associated with the UE resides; and
configure at least one of a downlink (DL) communication and an uplink (UL) communication between the UE and the eNodeB based on the selected geographical sub-area ID.

16. The computer-readable storage medium of claim 15, wherein the instructions to configure the at least one of the communication and the UL communication further comprise instruction to select the eNodeB for UL communication based on the selected geographical sub-area ID.

17. The computer-readable storage medium of claim 15, wherein the instructions to configure the at least one of the communication and the UL communication further comprise instruction to configure UL scheduling and inter-cell UL resource partitioning.

18. The computer-readable storage medium of claim 15, wherein the instructions to configure the at least one of the communication and the UL communication further comprise instruction to associate measurements with the selected geographical sub-area ID.

19. The computer-readable storage medium of claim 15, wherein the instructions to configure the at least one of the communication and the UL communication further comprise instruction to provide at least one of geographical specific broadcast services and geographical specific groupcast services.

20. The computer-readable storage medium of claim 19, wherein the at least one of geographical specific broadcast services and geographical specific groupcast services comprises enhancements for DL transmission including:
geographical specific radio network temporary identifier (RNTI) allocation;
determination of a geographical sub-area ID of a UE transmitter;
inter-cell coordination of a broadcast transmission schedule; and
enhancements for DL reception.

21. The computer-readable storage medium of claim 20, wherein the enhancements for DL reception include at least:
assistance information for a DL transmission schedule; and
association of geographical sub-area IDs with cell IDs, a single cell point-to-multipoint (SC-PTM) transmission schedule, and geographical services radio network temporary identifiers (G-RNTIs).

* * * * *